US011695858B2

(12) United States Patent
Dutta

(10) Patent No.: US 11,695,858 B2
(45) Date of Patent: Jul. 4, 2023

(54) PACKET FRAGMENTATION CONTROL

(71) Applicant: NOKIA SOLUTIONS AND NETWORKS OY, Espoo (FI)

(72) Inventor: Pranjal Kumar Dutta, Sunnyvale, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 113 days.

(21) Appl. No.: 17/078,325

(22) Filed: Oct. 23, 2020

(65) Prior Publication Data
US 2021/0084126 A1 Mar. 18, 2021

Related U.S. Application Data

(63) Continuation of application No. 16/124,310, filed on Sep. 7, 2018, now Pat. No. 10,827,041.

(51) Int. Cl.
*H04L 69/166* (2022.01)
*H04L 69/22* (2022.01)

(52) U.S. Cl.
CPC .......... *H04L 69/166* (2013.01); *H04L 69/22* (2013.01)

(58) Field of Classification Search
CPC .............................. H04L 69/166; H04L 69/22
See application file for complete search history.

(56) References Cited

U.S. PATENT DOCUMENTS

| 6,337,861 | B1* | 1/2002 | Rosen | H04L 69/22 370/341 |
| 2005/0243834 | A1* | 11/2005 | Fukuda | H04L 45/00 370/395.1 |
| 2005/0286517 | A1* | 12/2005 | Babbar | H04L 69/161 370/389 |
| 2010/0322249 | A1* | 12/2010 | Thathapudi | H04L 47/36 370/395.1 |

(Continued)

OTHER PUBLICATIONS

USC, "Internet Protocol: DARPA Internet Program Protocol Specification," RFC 791, Information Sciences Institute, Univ. of Southern California, Sep. 1981, 50 pages.
Heffner, et al., "IPv4 Reassembly Errors at High Data Rates," Network Working Group, RFC 4963, Jul. 2007, 10 pages.
Ziemba, et al., "Security Considerations for IP Fragment Filtering," Network Working Group, RFC 1858, Oct. 1995, 10 pages.

(Continued)

*Primary Examiner* — Edan Orgad
*Assistant Examiner* — Malick A Sohrab
(74) *Attorney, Agent, or Firm* — Tong, Rea, Bentley & Kim, LLC

(57) ABSTRACT

Various example embodiments for supporting control over fragmentation of packets in communication networks are described. Various example embodiments for supporting control over fragmentation of packets in communication networks may be configured to support control over fragmentation of Internet Protocol (IP) packets. Various example embodiments for supporting control over fragmentation of IP packets in communication networks may be configured to support control over fragmentation of an IP packet based on inclusion of an IP fragmentability header, including information indicative as to whether the IP packet is permitted to be fragmented, within the IP packet. The IP packet may (Continued)

include a header and a payload, where the header includes an IP packet header and the IP fragmentability header including the information indicative as to whether the IP packet is permitted to be fragmented and, optionally, additional information.

15 Claims, 21 Drawing Sheets

(56) References Cited

U.S. PATENT DOCUMENTS

| | | | | |
|---|---|---|---|---|
| 2013/0315102 | A1* | 11/2013 | Kahng | H04W 4/02 370/254 |
| 2014/0016545 | A1* | 1/2014 | Jaiswal | H04W 80/02 370/328 |
| 2014/0105226 | A1* | 4/2014 | Ganesh | H04L 69/329 370/474 |
| 2014/0153574 | A1* | 6/2014 | Louzoun | H04L 1/188 370/392 |
| 2015/0180758 | A1* | 6/2015 | Janardhanan | H04L 43/10 709/224 |
| 2015/0341278 | A1* | 11/2015 | Sundar | H04L 47/36 370/392 |
| 2017/0359448 | A1* | 12/2017 | Sung | H04L 63/0428 |
| 2018/0241671 | A1* | 8/2018 | Bosch | H04L 69/22 |

OTHER PUBLICATIONS

Mogul, et al., "Path MTU Discovery," Network Working Group, RFC 1191, Nov. 1990, 19 pages.
Postel, "Internet Control Message Protocol: DARPA Internet Program Protocol Specification," Network Working Group, RFC 792, Sep. 1981, 21 pages.
Conta, et al., "Internet Control Message Protocol (ICMPv6) for the Internet Protocol Version 6 (IPv6) Specification," Network Working Group, RFC 4443, Mar. 2006, 24 pages.
Deering, et al., "Internet Protocol, Version 6 (IPv6) Speciation," Network Working Group, RFC 2460, Dec. 1998, 39 pages.
Savola, "MTU and Fragmentation Issues with In-the-Network Tunneling," Network Working Group, RFC 4459, Apr. 2006, 14 pages.
Kent, "IP Encapsulating Security Payload (ESP)," Network Working Group, RFC 4303, Dec. 2005, 42 pages.
Nokia, " Nokia modernizes the Smart Grid to bring power distribution networks into the IoT era," downloaded from https://www.nokia.com/en_int/news/releases/2017/01/31/nokia-modernizes-the-smart-grid-to-bring-power-distribution-networks-into-the-iot-era, Jan. 31, 2017.
Nokia, "Field Ara Network for Power Utilities", downloaded from https://networks.nokia.com/power-utilities/field-area-network, printed on Sep. 10, 2018, 8 pages.
Nokia, "Network Group Encryption—Seamless Encryption for Mission Critical Networks," https://onestore.nokia.com/asset/187584/Nokia_Network_Group_Encryption_Application_Note_EN.pdf, printed on Sep. 10, 2018, 30 pages.

* cited by examiner

FIG. 8A

```
+-+-+-+-+-+-+-+-+-+-+-+-+-+-+-+-+-+-+-+-+-+-+-+-+-+-+-+-+-+-+-+-+
|Version| Traffic Class |         Flow Label                    |
+-+-+-+-+-+-+-+-+-+-+-+-+-+-+-+-+-+-+-+-+-+-+-+-+-+-+-+-+-+-+-+-+
|     Payload Length(1280)      |NextHeader(145)|   Hop Limit   |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                       Source Address                          +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                     Destination Address                       +
|                                                               |
~~~~~~                                                    ~~~~~~
```

*FIG. 9A*

IP Fragment 1:

```
+-+-+-+-+-+-+-+-+-+-+-+-+-+-+-+-+-+-+-+-+-+-+-+-+-+-+-+-+-+-+-+-+
|Version| Traffic Class |           Flow Label                  |
+-+-+-+-+-+-+-+-+-+-+-+-+-+-+-+-+-+-+-+-+-+-+-+-+-+-+-+-+-+-+-+-+
|      Payload Length(492)      |NextHeader(145)|   Hop Limit   |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                         Source Address                        +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                       Destination Address                     +
|                                                               |
~~~~~                                                      ~~~~~
```

FIG. 10A

IP Fragment 2:

```
+-+-+-+-+-+-+-+-+-+-+-+-+-+-+-+-+-+-+-+-+-+-+-+-+-+-+-+-+-+-+-+-+
|Version| Traffic Class |            Flow Label                 |
+-+-+-+-+-+-+-+-+-+-+-+-+-+-+-+-+-+-+-+-+-+-+-+-+-+-+-+-+-+-+-+-+
|     Payload Length(492)       |NextHeader(145)|   Hop Limit   |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                        Source Address                         +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                      Destination Address                      +
|                                                               |
~~~~~~                                                    ~~~~~~
```

*FIG. 11A*

IP Fragment 3:

```
+-+-+-+-+-+-+-+-+-+-+-+-+-+-+-+-+-+-+-+-+-+-+-+-+-+-+-+-+-+-+-+-+
|Version| Traffic Class |           Flow Label                  |
+-+-+-+-+-+-+-+-+-+-+-+-+-+-+-+-+-+-+-+-+-+-+-+-+-+-+-+-+-+-+-+-+
|     Payload Length(360)       |NextHeader(145)|    Hop Limit   |
+-+-+-+-+-+-+-+-+-+-+-+-+-+-+-+-+-+-+-+-+-+-+-+-+-+-+-+-+-+-+-+-+
|                                                                |
+                                                                +
|                                                                |
+                        Source Address                          +
|                                                                |
+                                                                +
|                                                                |
+-+-+-+-+-+-+-+-+-+-+-+-+-+-+-+-+-+-+-+-+-+-+-+-+-+-+-+-+-+-+-+-+
|                                                                |
+                                                                +
|                                                                |
+                     Destination Address                        +
|                                                                |
~~~~~~                                                     ~~~~~~
```

*FIG. 12A*

```
+-+-+-+-+-+-+-+-+-+-+-+-+-+-+-+-+-+-+-+-+-+-+-+-+-+-+-+-+-+-+-+-+
|Version| Traffic Class |            Flow Label                 |
+-+-+-+-+-+-+-+-+-+-+-+-+-+-+-+-+-+-+-+-+-+-+-+-+-+-+-+-+-+-+-+-+
|     Payload Length(540)       |NextHeader (44)|   Hop Limit    |
+-+-+-+-+-+-+-+-+-+-+-+-+-+-+-+-+-+-+-+-+-+-+-+-+-+-+-+-+-+-+-+-+
|                                                                |
+                                                                +
|                                                                |
+                        Source Address                          +
|                                                                |
+                                                                +
|                                                                |
+-+-+-+-+-+-+-+-+-+-+-+-+-+-+-+-+-+-+-+-+-+-+-+-+-+-+-+-+-+-+-+-+
|                                                                |
+                                                                +
|                                                                |
+                      Destination Address                       +
|                                                                |
~~~~~~                                                    ~~~~~~
```

*FIG. 12B*

```
~~~~~                                                             ~~~~~
+                     Destination Address                             +
|                                                                     |
+-+-+-+-+-+-+-+-+-+-+-+-+-+-+-+-+-+-+-+-+-+-+-+-+-+-+-+-+-+-+-+-+
| NextHeader(44)|    Reserved     |0|1|0|                             |
+-+-+-+-+-+-+-+-+-+-+-+-+-+-+-+-+-+-+-+-+-+-+-+-+-+-+-+-+-+-+-+-+
|                                                                     |
+                                                                     +
|                                                                     |
+                    IPv6 Reporting Address                           +
|                                                                     |
+                                                                     +
|                                                                     |
+-+-+-+-+-+-+-+-+-+-+-+-+-+-+-+-+-+-+-+-+-+-+-+-+-+-+-+-+-+-+-+-+
|  NextHeader   |    Reserved     |    Fragment Offset(0)  |Res|1|
+-+-+-+-+-+-+-+-+-+-+-+-+-+-+-+-+-+-+-+-+-+-+-+-+-+-+-+-+-+-+-+-+
|                       Identification                                |
+-+-+-+-+-+-+-+-+-+-+-+-+-+-+-+-+-+-+-+-+-+-+-+-+-+-+-+-+-+-+-+-+
|                                                                     |
//                    Payload   (512 octets)                         //
|                                                                     |
+-+-+-+-+-+-+-+-+-+-+-+-+-+-+-+-+-+-+-+-+-+-+-+-+-+-+-+-+-+-+-+-+
```

*FIG. 13A*

IP Fragment 1:

```
+-+-+-+-+-+-+-+-+-+-+-+-+-+-+-+-+-+-+-+-+-+-+-+-+-+-+-+-+-+-+-+-+
|Version| Traffic Class |           Flow Label                  |
+-+-+-+-+-+-+-+-+-+-+-+-+-+-+-+-+-+-+-+-+-+-+-+-+-+-+-+-+-+-+-+-+
|     Payload Length(492)       |NextHeader (44)|   Hop Limit   |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                        Source Address                         +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                     Destination Address                       +
|                                                               |
~~~~~~                                                     ~~~~~~
```

FIG. 13B

IP Fragment 1:

```
~~~~~~                                                              ~~~~~~
+                    Destination Address                                 +
|                                                                        |
+-+-+-+-+-+-+-+-+-+-+-+-+-+-+-+-+-+-+-+-+-+-+-+-+-+-+-+-+-+-+-+-+
| NextHeader(44)|   Reserved       |0|1|0|                               |
+-+-+-+-+-+-+-+-+-+-+-+-+-+-+-+-+-+-+-+-+-+-+-+-+-+-+-+-+-+-+-+-+
|                                                                        |
+                                                                        +
|                                                                        |
+                    IPv6 Reporting Address                              +
|                                                                        |
+                                                                        +
|                                                                        |
+-+-+-+-+-+-+-+-+-+-+-+-+-+-+-+-+-+-+-+-+-+-+-+-+-+-+-+-+-+-+-+-+
|  NextHeader   |   Reserved    |      Fragment Offset(0)   |Res|1|
+-+-+-+-+-+-+-+-+-+-+-+-+-+-+-+-+-+-+-+-+-+-+-+-+-+-+-+-+-+-+-+-+
|                        Identification                                  |
+-+-+-+-+-+-+-+-+-+-+-+-+-+-+-+-+-+-+-+-+-+-+-+-+-+-+-+-+-+-+-+-+
|                                                                        |
//                   Payload    (464 octets)                            //
|                                                                        |
+-+-+-+-+-+-+-+-+-+-+-+-+-+-+-+-+-+-+-+-+-+-+-+-+-+-+-+-+-+-+-+-+
```

*FIG. 14A*

IP Fragment 2:

```
+-+-+-+-+-+-+-+-+-+-+-+-+-+-+-+-+-+-+-+-+-+-+-+-+-+-+-+-+-+-+-+-+
|Version| Traffic Class |           Flow Label                  |
+-+-+-+-+-+-+-+-+-+-+-+-+-+-+-+-+-+-+-+-+-+-+-+-+-+-+-+-+-+-+-+-+
|     Payload Length(76)        |NextHeader (44)|   Hop Limit   |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                        Source Address                         +
|                                                               |
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                      Destination Address                      +
|                                                               |
~~~~~                                                       ~~~~~
```

IP Fragment 2:

PACKET FRAGMENTATION CONTROL

CROSS-REFERENCE TO RELATED APPLICATIONS

This application is a continuation of U.S. patent application Ser. No. 16/124,310, filed on Sep. 7, 2018, entitled PACKET FRAGMENTATION CONTROL, which is hereby incorporated herein by reference.

TECHNICAL FIELD

Various example embodiments relate generally to communication networks and, more particularly but not exclusively, to supporting packet fragmentation control in communication networks.

BACKGROUND

In many communication networks, various communications technologies may be used to support communications.

SUMMARY

Various example embodiments relate generally to supporting control over fragmentation of packets in communication networks.

In at least some example embodiments, an apparatus includes at least one processor and at least one memory including computer program code, wherein the at least one memory and the computer program code are configured to, with the at least one processor, cause the apparatus to at least handle an Internet Protocol (IP) packet including a payload and a header, the header including an IP packet header and an IP fragmentability header, the IP fragmentability header including information indicative as to whether the IP packet is permitted to be fragmented. In at least some example embodiments, the IP fragmentability header is located between the payload and the IP packet header. In at least some example embodiments, the IP packet is an IP fragment of an original IP packet including the IP packet header, wherein the IP packet further includes an IP fragment header. In at least some example embodiments, the IP fragmentability header is located between the IP fragment header and the IP packet header. In at least some example embodiments, the information indicative as to whether the IP packet is permitted to be fragmented includes a fragmentability flag. In at least some example embodiments, the IP fragmentability header includes information indicative as to whether dropping of the IP packet, when the IP packet is not permitted to be fragmented, is to be reported to a device other than a source of the IP packet. In at least some example embodiments, the information indicative as to whether dropping of the IP packet is to be reported to a device other than a source of the IP packet includes a reporting address indicator. In at least some example embodiments, the IP fragmentability header includes information indicative as to whether dropping of the IP packet, when the IP packet is not permitted to be fragmented, is to be reported to both a source of the IP packet and to a device other than the source of the IP packet. In at least some example embodiments, the information indicative as to whether dropping of the IP packet is to be reported to both a source of the IP packet and to a device other than the source of the IP packet includes a reporting address indicator and a wildcard reporting indicator. In at least some example embodiments, the IP fragmentability header includes information configured for use in reporting dropping of the IP packet, when the IP packet is not permitted to be fragmented, to a device other than a source of the IP packet. In at least some example embodiments, the information configured for use in reporting dropping of the IP packet to a device other than a source of the IP packet includes a reporting address. In at least some example embodiments, the information configured for use in reporting dropping of the IP packet to a device other than a source of the IP packet includes a reporting address type indicator configured to indicate whether the reporting address is an IP version 4 (IPv4) address or an IP version 6 (IPv6) address. In at least some example embodiments, to handle the IP packet, the at least one memory and the computer program code are configured to, with the at least one processor, cause the apparatus to at least generate the header, associate the header with the payload to form the IP packet, and send the IP packet toward a network element. In at least some example embodiments, to handle the IP packet, the at least one memory and the computer program code are configured to, with the at least one processor, cause the apparatus to at least receive the IP packet and determine handling of the IP packet based on the IP fragmentability header. In at least some example embodiments, to determine handling of the IP packet based on the IP fragmentability header, the at least one memory and the computer program code are configured to, with the at least one processor, cause the apparatus to at least determine a maximum transmission unit (MTU) size of a next hop for the IP packet and drop the IP packet based on a determination that the MTU size of the next hop for the IP packet is less than a packet size of the IP packet and based on a determination that the IP fragmentability header is indicative that fragmentation is not permitted. In at least some example embodiments, the at least one memory and the computer program code are configured to, with the at least one processor, cause the apparatus to at least initiate, based on a determination that the IP fragmentability header includes a reporting address, a reporting message toward the reporting address. In at least some example embodiments, the at least one memory and the computer program code are configured to, with the at least one processor, cause the apparatus to at least initiate, based on a determination that the IP fragmentability header does not include a reporting address, a reporting message toward a source of the IP packet. In at least some example embodiments, to determine handling of the IP packet based on the IP fragmentability header, the at least one memory and the computer program code are configured to, with the at least one processor, cause the apparatus to at least determine a maximum transmission unit (MTU) size of a next hop for the IP packet, fragment the IP packet, based on a determination that the MTU size of the next hop for the IP packet is less than a packet size of the IP packet and based on a determination that the IP fragmentability header is indicative that fragmentation is permitted, to form a set of IP fragments, and send the set of IP fragments toward the next hop for the IP packet. In at least some example embodiments, each of the IP fragments includes a respective IP packet header based on the IP packet header of the IP packet, a respective IP fragmentability header based on the IP fragmentability header of the IP packet, a respective IP fragment header for the respective IP fragment, and a respective portion of the payload of the IP packet.

In at least some example embodiments, a non-transitory computer readable medium includes program instructions for causing an apparatus to at least handle an Internet Protocol (IP) packet including a payload and a header, the header including an IP packet header and an IP fragmentability header, the IP fragmentability header including information indicative as to whether the IP packet is permitted to be fragmented. In at least some example embodiments, the IP fragmentability header is located between the payload and the IP packet header. In at least some example embodiments, the IP packet is an IP fragment of an original IP packet including the IP packet header, wherein the IP packet further includes an IP fragment header. In at least some example embodiments, the IP fragmentability header is located between the IP fragment header and the IP packet header. In at least some example embodiments, the information indicative as to whether the IP packet is permitted to be fragmented includes a fragmentability flag. In at least some example embodiments, the IP fragmentability header includes information indicative as to whether dropping of the IP packet, when the IP packet is not permitted to be fragmented, is to be reported to a device other than a source of the IP packet. In at least some example embodiments, the information indicative as to whether dropping of the IP packet is to be reported to a device other than a source of the IP packet includes a reporting address indicator. In at least some example embodiments, the IP fragmentability header includes information indicative as to whether dropping of the IP packet, when the IP packet is not permitted to be fragmented, is to be reported to both a source of the IP packet and to a device other than the source of the IP packet. In at least some example embodiments, the information indicative as to whether dropping of the IP packet is to be reported to both a source of the IP packet and to a device other than the source of the IP packet includes a reporting address indicator and a wildcard reporting indicator. In at least some example embodiments, the IP fragmentability header includes information configured for use in reporting dropping of the IP packet, when the IP packet is not permitted to be fragmented, to a device other than a source of the IP packet. In at least some example embodiments, the information configured for use in reporting dropping of the IP packet to a device other than a source of the IP packet includes a reporting address. In at least some example embodiments, the information configured for use in reporting dropping of the IP packet to a device other than a source of the IP packet includes a reporting address type indicator configured to indicate whether the reporting address is an IP version 4 (IPv4) address or an IP version 6 (IPv6) address. In at least some example embodiments, to handle the IP packet, the non-transitory computer readable medium includes program instructions for causing the apparatus to at least generate the header, associate the header with the payload to form the IP packet, and send the IP packet toward a network element. In at least some example embodiments, to handle the IP packet, the non-transitory computer readable medium includes program instructions for causing the apparatus to at least receive the IP packet and determine handling of the IP packet based on the IP fragmentability header. In at least some example embodiments, to determine handling of the IP packet based on the IP fragmentability header, the non-transitory computer readable medium includes program instructions for causing the apparatus to at least determine a maximum transmission unit (MTU) size of a next hop for the IP packet and drop the IP packet based on a determination that the MTU size of the next hop for the IP packet is less than a packet size of the IP packet and based on a determination that the IP fragmentability header is indicative that fragmentation is not permitted. In at least some example embodiments, the non-transitory computer readable medium includes program instructions for causing the apparatus to at least initiate, based on a determination that the IP fragmentability header includes a reporting address, a reporting message toward the reporting address. In at least some example embodiments, the non-transitory computer readable medium includes program instructions for causing the apparatus to at least initiate, based on a determination that the IP fragmentability header does not include a reporting address, a reporting message toward a source of the IP packet. In at least some example embodiments, to determine handling of the IP packet based on the IP fragmentability header, the non-transitory computer readable medium includes program instructions for causing the apparatus to at least determine a maximum transmission unit (MTU) size of a next hop for the IP packet, fragment the IP packet, based on a determination that the MTU size of the next hop for the IP packet is less than a packet size of the IP packet and based on a determination that the IP fragmentability header is indicative that fragmentation is permitted, to form a set of IP fragments, and send the set of IP fragments toward the next hop for the IP packet. In at least some example embodiments, each of the IP fragments includes a respective IP packet header based on the IP packet header of the IP packet, a respective IP fragmentability header based on the IP fragmentability header of the IP packet, a respective IP fragment header for the respective IP fragment, and a respective portion of the payload of the IP packet.

In at least some example embodiments, a method includes handling, at an apparatus, an Internet Protocol (IP) packet including a payload and a header, the header including an IP packet header and an IP fragmentability header, the IP fragmentability header including information indicative as to whether the IP packet is permitted to be fragmented. In at least some example embodiments, the IP fragmentability header is located between the payload and the IP packet header. In at least some example embodiments, the IP packet is an IP fragment of an original IP packet including the IP packet header, wherein the IP packet further includes an IP fragment header. In at least some example embodiments, the IP fragmentability header is located between the IP fragment header and the IP packet header. In at least some example embodiments, the information indicative as to whether the IP packet is permitted to be fragmented includes a fragmentability flag. In at least some example embodiments, the IP fragmentability header includes information indicative as to whether dropping of the IP packet, when the IP packet is not permitted to be fragmented, is to be reported to a device other than a source of the IP packet. In at least some example embodiments, the information indicative as to whether dropping of the IP packet is to be reported to a device other than a source of the IP packet includes a reporting address indicator. In at least some example embodiments, the IP fragmentability header includes information indicative as to whether dropping of the IP packet, when the IP packet is not permitted to be fragmented, is to be reported to both a source of the IP packet and to a device other than the source of the IP packet. In at least some example embodiments, the information indicative as to whether dropping of the IP packet is to be reported to both a source of the IP packet and to a device other than the source of the IP packet includes a reporting address indicator and a wildcard reporting indicator. In at least some example embodiments, the IP fragmentability header includes information configured for use in reporting dropping of the IP packet, when the IP packet is not permitted to be fragmented, to a device other than a source of the IP packet. In at least some example embodiments, the information configured for use in reporting dropping of the IP packet to a device other than a source of the IP packet includes a reporting address. In at least some example embodiments, the information configured for use in reporting dropping of the IP packet to a device other than a source of the IP packet includes a reporting address type indicator configured to indicate whether the reporting address is an IP version 4 (IPv4) address or an IP version 6 (IPv6) address. In at least some example embodiments, handling the IP packet includes generating the header, associating the header with the payload to form the IP packet, and sending the IP packet toward a network element. In at least some example embodiments, handling the IP packet includes receiving the IP packet and determining handling of the IP packet based on the IP fragmentability header. In at least some example embodiments, determining handling of the IP packet based on the IP fragmentability header includes determining a maximum transmission unit (MTU) size of a next hop for the IP packet and dropping the IP packet based on a determination that the MTU size of the next hop for the IP packet is less than a packet size of the IP packet and based on a determination that the IP fragmentability header is indicative that fragmentation is not permitted. In at least some example embodiments, the method includes initiating, based on a determination that the IP fragmentability header includes a reporting address, a reporting message toward the reporting address. In at least some example embodiments, the method includes initiating, based on a determination that the IP fragmentability header does not include a reporting address, a reporting message toward a source of the IP packet. In at least some example embodiments, determining handling of the IP packet based on the IP fragmentability header includes determining a maximum transmission unit (MTU) size of a next hop for the IP packet, fragmenting the IP packet, based on a determination that the MTU size of the next hop for the IP packet is less than a packet size of the IP packet and based on a determination that the IP fragmentability header is indicative that fragmentation is permitted, to form a set of IP fragments, and sending the set of IP fragments toward the next hop for the IP packet. In at least some example embodiments, each of the IP fragments includes a respective IP packet header based on the IP packet header of the IP packet, a respective IP fragmentability header based on the IP fragmentability header of the IP packet, a respective IP fragment header for the respective IP fragment, and a respective portion of the payload of the IP packet.

In at least some example embodiments, an apparatus includes means for handling an Internet Protocol (IP) packet including a payload and a header, the header including an IP packet header and an IP fragmentability header, the IP fragmentability header including information indicative as to whether the IP packet is permitted to be fragmented. In at least some example embodiments, the IP fragmentability header is located between the payload and the IP packet header. In at least some example embodiments, the IP packet is an IP fragment of an original IP packet including the IP packet header, wherein the IP packet further includes an IP fragment header. In at least some example embodiments, the IP fragmentability header is located between the IP fragment header and the IP packet header. In at least some example embodiments, the information indicative as to whether the IP packet is permitted to be fragmented includes a fragmentability flag. In at least some example embodiments, the IP fragmentability header includes information indicative as to whether dropping of the IP packet, when the IP packet is not permitted to be fragmented, is to be reported to a device other than a source of the IP packet. In at least some example embodiments, the information indicative as to whether dropping of the IP packet is to be reported to a device other than a source of the IP packet includes a reporting address indicator. In at least some example embodiments, the IP fragmentability header includes information indicative as to whether dropping of the IP packet, when the IP packet is not permitted to be fragmented, is to be reported to both a source of the IP packet and to a device other than the source of the IP packet. In at least some example embodiments, the information indicative as to whether dropping of the IP packet is to be reported to both a source of the IP packet and to a device other than the source of the IP packet includes a reporting address indicator and a wildcard reporting indicator. In at least some example embodiments, the IP fragmentability header includes information configured for use in reporting dropping of the IP packet, when the IP packet is not permitted to be fragmented, to a device other than a source of the IP packet. In at least some example embodiments, the information configured for use in reporting dropping of the IP packet to a device other than a source of the IP packet includes a reporting address. In at least some example embodiments, the information configured for use in reporting dropping of the IP packet to a device other than a source of the IP packet includes a reporting address type indicator configured to indicate whether the reporting address is an IP version 4 (IPv4) address or an IP version 6 (IPv6) address. In at least some example embodiments, the means for handling the IP packet includes means for generating the header, means for associating the header with the payload to form the IP packet, and means for sending the IP packet toward a network element. In at least some example embodiments, the means for handling the IP packet includes means for receiving the IP packet and means for determining handling of the IP packet based on the IP fragmentability header. In at least some example embodiments, the means for determining handling of the IP packet based on the IP fragmentability header includes means for determining a maximum transmission unit (MTU) size of a next hop for the IP packet and means for dropping the IP packet based on a determination that the MTU size of the next hop for the IP packet is less than a packet size of the IP packet and based on a determination that the IP fragmentability header is indicative that fragmentation is not permitted. In at least some example embodiments, the apparatus includes means for initiating, based on a determination that the IP fragmentability header includes a reporting address, a reporting message toward the reporting address. In at least some example embodiments, the apparatus includes means for initiating, based on a determination that the IP fragmentability header does not include a reporting address, a reporting message toward a source of the IP packet. In at least some example embodiments, the means for determining handling of the IP packet based on the IP fragmentability header includes means for determining a maximum transmission unit (MTU) size of a next hop for the IP packet, means for fragmenting the IP packet, based on a determination that the MTU size of the next hop for the IP packet is less than a packet size of the IP packet and based on a determination that the IP fragmentability header is indicative that fragmentation is permitted, to form a set of IP fragments, and means for sending the set of IP fragments toward the next hop for the IP packet. In at least some example embodiments, each of the IP fragments includes a respective IP packet header based on the IP packet header of the IP packet, a respective IP fragmentability header based on the IP fragmentability header of the IP packet, a respective IP fragment header for the respective IP fragment, and a respective portion of the payload of the IP packet.

BRIEF DESCRIPTION OF THE DRAWINGS

The teachings herein can be readily understood by considering the following detailed description in conjunction with the accompanying drawings, in which:

FIGS. 8A and 8B depict an example embodiment of an IPv6 packet that is to be fragmented based on an IPv6 Fragmentability Header;

FIGS. 9A and 9B depict an example embodiment of a first IP Fragment formed from fragmentation of the IPv6 packet of FIGS. 8A and 8B;

FIGS. 10A and 10B depict an example embodiment of a second IP Fragment formed from fragmentation of the IPv6 packet of FIGS. 8A and 8B;

FIGS. 11A and 11B depict an example embodiment of a third IP Fragment formed from fragmentation of the IPv6 packet of FIGS. 8A and 8B;

FIGS. 12A and 12B depict an example embodiment of an IP Fragment that is to be fragmented based on an IPv6 Fragmentability Header;

FIGS. 13A and 13B depict an example embodiment of a first IP Fragment formed from fragmentation of the IP Fragment of FIGS. 12A and 12B;

FIGS. 14A and 14B depict an example embodiment of a second IP Fragment formed from fragmentation of the IP Fragment of FIGS. 12A and 12B.

To facilitate understanding, identical reference numerals have been used, where possible, to designate identical elements that are common to the figures.

DETAILED DESCRIPTION

Various example embodiments for supporting control over fragmentation of packets in communication networks are presented. Various example embodiments for supporting control over fragmentation of packets in communication networks may be configured to support control over fragmentation of Internet Protocol (IP) packets (e.g., IP version 4 (IPv4) packets, IP version 6 (IPv6) packets, or the like) in a communication network. Various example embodiments for supporting control over fragmentation of IP packets in communication networks may be configured to support control over fragmentation of an IP packet based on inclusion of an IP fragmentability header, including information indicative as to whether the IP packet is permitted to be fragmented, within the IP packet. The IP fragmentability header may be included within the IP packet at the IP layer. The IP packet may include a header and a payload, where the header includes an IP packet header (e.g., including information such as source IP address, destination IP address, and so forth) and the IP fragmentability header including the information indicative as to whether the IP packet is permitted to be fragmented and, optionally, additional information (e.g., information for use in reporting dropping of the IP packet to a device other than the source of the IP packet or the like). Various example embodiments for supporting control over fragmentation of IP packets in communication networks, by supporting use of an IP fragmentability header to support control over fragmentation of IP packets in communication networks, may be configured to support enhancements to forward fragmentation of IPv4 packets in communication networks (e.g., for controlling reporting of packet drops due to handling of fragmentation processing or the like). Various example embodiments for supporting control over fragmentation of IP packets in communication networks, by supporting use of an IP fragmentability header to support control over fragmentation of IP packets in communication networks, may be configured to support forward fragmentation of IPv6 packets in communication networks (e.g., for controlling fragmentability of packets, reporting of packet drops due to handling of fragmentation processing, or the like). It is noted that these and various other example embodiments and potential advantages related to supporting control over fragmentation of packets in communication networks may be further understood by way of reference to the various figures, which are discussed further below.

Figure 1:
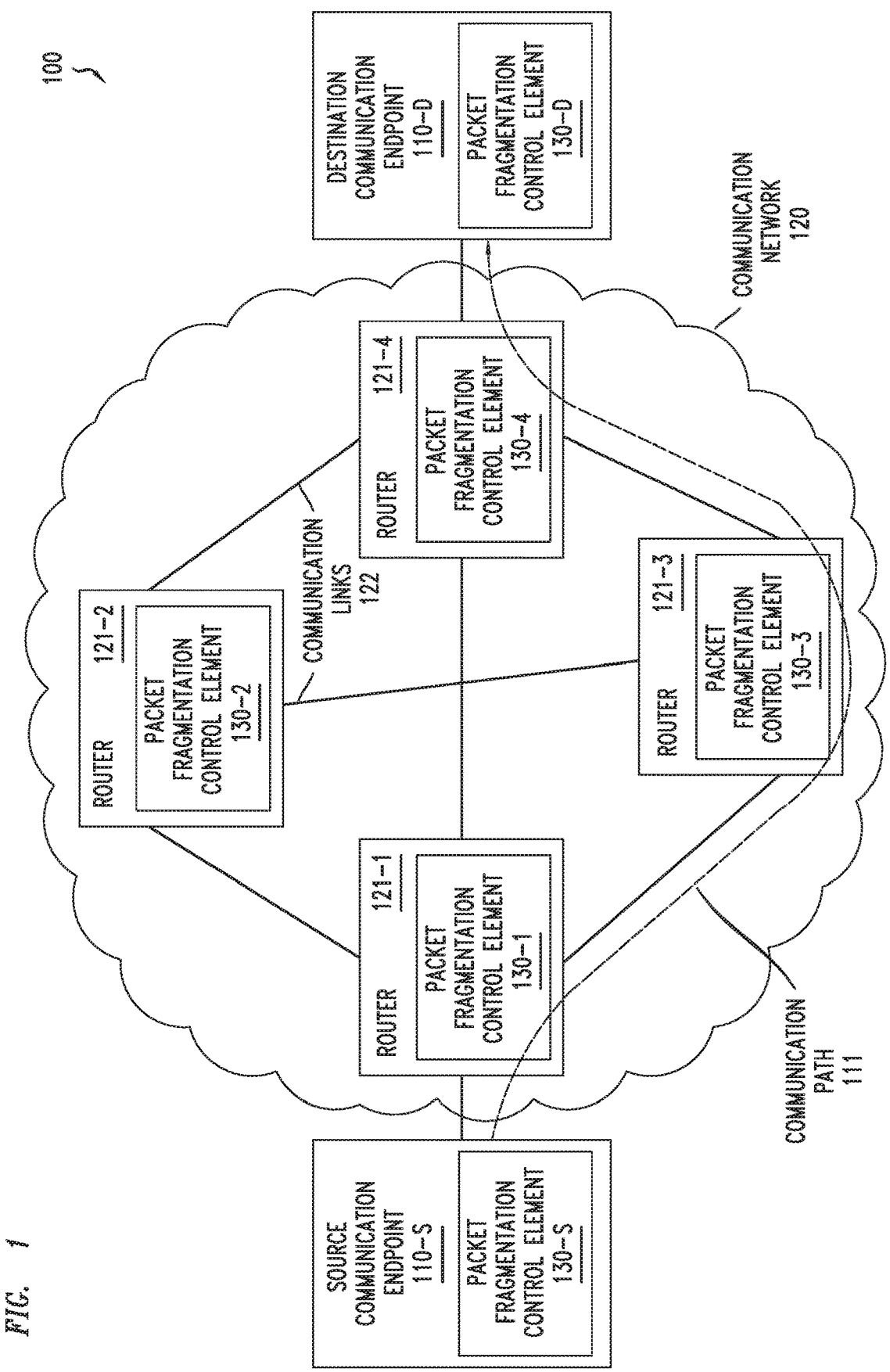
FIG. 1 depicts an example embodiment of a communication system configured to support control over fragmentation of IP packets.

FIG. 1 depicts an example embodiment of a communication system configured to support control over fragmentation of IP packets.

The communication system 100 includes a pair of communication endpoints 110 (illustratively, a source communication endpoint 110-S and a destination communication endpoint 110-D) and a communication network 120 configured to support communications between the communication endpoints 110.

The communication endpoints 110 are communication devices configured to communicate using IP-based communications. The communication endpoints 110 are configured to communicate via a communication path 111 supported via the communication network 120. The communication path 111 may be an IP-based communication path between communication endpoints 110. For example, the communication endpoints 110 may be end devices (e.g., computers, smartphones, Internet-of-Things (IoT) devices, servers, or the like), network devices (e.g., customer edge routers which may interface with routers in communication network 120, provider edge routers which may interface with provider core routers in the communication network 120, wireless network gateways, IoT gateways, network servers, or the like), or the like.

The communication network 120 is configured to support the communications between the communication endpoints 110 via the communication path 111. The communication network 120 includes a set of routers 121-1-121-4 (collectively, routers 121) and a set of communication links 122. The routers 121 are configured to route IP datagrams via the communication links 122. The communication links 122 associated with the routers 121 provide IP hops for the IP-based communications of the communication path 111 between the communication endpoints 110. The communication path 111 includes source communication endpoint 110-S, a hop between the source communication endpoint 110-S and the router 121-1, a hop between the router 121-1 and the router 121-3, a hop between the router 121-3 and the router 121-4, a hop between the router 121-4 and the destination communication endpoint 110-D, and the destination communication endpoint 110-D.

The communication endpoints 110, as indicated above, communicate via communication path 111 which is supported via the communication network 120. The source communication endpoint 110-S sends data to the destination communication endpoint 110-D using IP datagrams, or packets, which are routed over the communication path 111. The hops of the communication path 111 have maximum transmission unit (MTU) sizes associated therewith and, therefore, the communication path 111 has a path MTU (PMTU) size associated therewith. In general, the PMTU size of an IP communication path, such as the communication path 111, is the maximum size of an IP packet that can traverse the IP communication path without suffering fragmentation and, thus, will be the smallest MTU size of the MTU sizes of the IP hops of the IP communication path since the MTU size for an IP hop of an IP communication path is the maximum size of an IP packet that can be transmitted without fragmentation over a given medium for that IP hop of the IP communication path.

The communication system 100 is configured to support packet fragmentation control functions configured to support control over fragmentation of IP packets communicated within the communication system 100. The various devices of communication system 100 include packet fragmentation control elements 130 configured to provide various packet fragmentation control functions (illustratively, source communication endpoint 110-S includes a packet fragmentation control element 130-S, the routers 121-1-121-4 include packet fragmentation control elements 130-1-130-4, and destination communication endpoint 110-D includes a packet fragmentation control element 130-D, respectively). It will be appreciated that the packet fragmentation control functions that are supported or performed by a given packet fragmentation control element 130 may depend on the role performed by the device that hosts the given packet fragmentation control element 130 (e.g., depending on whether the device is a source node for the communication path, a transit node for the communication path, or a destination node for the communication path). The various packet fragmentation control functions are further described within the context of the roles performed by the devices that host the packet fragmentation control elements 130.

The devices hosting packet fragmentation control elements 130 are configured to handle an IP packet including a payload and a header, where the header includes an IP packet header and an IP fragmentability header. As discussed further below, handling of an IP packet may be based on the header and may include one or more of generation of the IP packet, transmission of the IP packet, reception of the IP packet, processing of the IP packet, fragmentation of the IP packet, reassembly of the IP packet, dropping of the IP packet, forwarding of the IP packet, or the like, as well as various combinations thereof.

The IP packet may be an original IP packet that has not yet undergone fragmentation or an IP fragment of an original IP packet that has undergone fragmentation. In either case, the IP fragmentability header may be located between the payload and the IP packet header. In the case in which the IP packet is an IP fragment of an original IP packet that has undergone fragmentation, the IP packet may further include an IP fragment header and the IP fragmentability header may be located between the IP fragment header and the IP packet header.

The IP fragmentability header may include information indicative as to whether the IP packet is permitted to be fragmented. The information indicative as to whether the IP packet is permitted to be fragmented may be provided using one or more flags fields. The information indicative as to whether the IP packet is permitted to be fragmented may be indicated using a fragmentability flag configured to indicate whether the IP packet is permitted to be fragmented (e.g., one or more bits which may be set in a manner for indicating whether fragmentation of the IP packet is permitted or not permitted). For example, the fragmentability flag may be a Don't Fragment flag (e.g., a value of "0" is indicative that the IP packet may be fragmented and a value of "1" is indicative that the IP packet may not be fragmented) or a Fragment flag (e.g., a value of "0" is indicative that the IP packet may not be fragmented and a value of "1" is indicative that the IP packet may be fragmented).

The IP fragmentability header may include information configured to control reporting of dropping of an IP packet when the IP packet is dropped based on an indication that the IP packet is not permitted to be fragmented. The information configured to control reporting of dropping of an IP packet when the IP packet is dropped based on an indication that the IP packet is not permitted to be fragmented may include one or more fields configured to indicate whether the dropping of the IP packet is to be reported only to the source of the IP packet, only to a device (e.g., reporting address) that is different than the source of the IP packet, or to both the source of the IP packet and the device (e.g., reporting address) that is different than the source of the IP packet. The information configured to control reporting of dropping of an IP packet when the IP packet is dropped based on an indication that the IP packet is not permitted to be fragmented may include a reporting address flag, a reporting address field, and a wildcard flag.

The IP fragmentability header, as indicated above, may include information indicative as to whether dropping of the IP packet, when the IP packet is dropped based on an indication that the IP packet is not permitted to be fragmented, is to be reported to a device other than the source of the IP packet. The information indicative as to whether dropping of the IP packet is to be reported to a device other than the source of the IP packet may be provided using one or more flags fields. The information indicative as to whether dropping of the IP packet is to be reported to a device other than the source of the IP packet may be indicated using a reporting address flag (e.g., one or more bits which may be set in a manner for indicating whether dropping of the IP packet is to be reported to a device other than the source of the IP packet) configured to indicate whether the IP fragmentability header includes a reporting address for reporting dropping of the IP packet to a device other than the source of the IP packet (which also may be considered to be an indication as to whether dropping of the IP packet is to be reported to a device other than the source of the IP packet, e.g., if a reporting address is included then dropping is to be reported to a device other than the source of the IP packet and if a reporting address is not included then dropping is to be reported to the source of the IP packet). For example, the reporting address flag may be a Reporting Address Included flag (e.g., a value of "0" is indicative that a reporting address is not included and a value of "1" is indicative that a reporting address is included) or a Reporting Address Not Included flag (e.g., a value of "0"

is indicative that a reporting address is included and a value of "1" is indicative that a reporting address is not included).

The IP fragmentability header, as indicated above, may include information configured for use in reporting dropping of the IP packet, to a device other than the source of the IP packet, when the IP packet is dropped based on an indication that the IP packet is not permitted to be fragmented.

The information configured for use in reporting dropping of the IP packet may include a reporting address to which dropping of the IP packet is to be reported when the IP packet is dropped based on an indication that the IP packet is not permitted to be fragmented. The reporting address to which dropping of the IP packet is to be reported may be provided using a reporting address field which may be configured to include an IPv4 reporting address or an IPv6 reporting address. The device to which dropping of the IP packet is to be reported may be a controller (e.g., a software defined networking (SDN) controller or other controller), a server, or the like. The device to which dropping of the IP packet is to be reported may be a controller that is interested in detecting such packet drops, e.g., for tracking such packet drops for statistical purposes, for initiating one or more actions associated with such packet drops (e.g., reconfiguring states, reconfiguring flows, or the like) in order to try to prevent additional packet drops, or the like, as well as various combinations thereof.

The information configured for use in reporting dropping of the IP packet also may include a reporting address type indicator which may provide an indication of the type of reporting address included in the reporting address field and, thus, which also may provide an indication of the size of the reporting address field (e.g., 32 bits for an IPv4 reporting address or 128 bits for an IPv6 reporting address). The reporting address type indicator may be provided using a reporting address type flag configured to indicate the address type of the reporting address (e.g., one or more bits which may be set in a manner for indicating the address type of the reporting address). For example, the reporting address type flag may be an Address Version flag configured to distinguish between IPv4 and IPv6 addresses (e.g., a value of "0" is indicative that a reporting address included in the Reporting Address field is an IPv4 address and a value of "1" is indicative that a reporting address included in the Reporting Address field is an IPv6 address).

The IP fragmentability header, as indicated above, may include information configured for use in controlling whether dropping of the IP packet is reported only to a device other than the source of the IP packet (using the reporting address) or whether dropping of the IP packet is reported to both the source of the IP packet and to a device other than the source of the IP packet. The information configured for use in controlling whether dropping of the IP packet is reported only to a device other than the source of the IP packet or whether dropping of the IP packet is reported to both the source of the IP packet and a device other than the source of the IP packet may be provided using one or more flags fields. The information configured for use in controlling whether dropping of the IP packet is reported only to a device other than the source of the IP packet or whether dropping of the IP packet is reported to both the source of the IP packet and to a device other than the source of the IP packet may be indicated using a wildcard reporting flag (e.g., one or more bits which may be set in a manner for indicating whether dropping of the IP packet is to be reported only to a device other than the source of the IP packet or whether dropping of the IP packet is reported to both the source of the IP packet and a device other than the source of the IP packet). For example, the wildcard reporting flag may be a Wildcard Reporting flag (e.g., a value of "0" is indicative that dropping of the IP packet is to be reported only to a device other than the source of the IP packet and a value of "1" is indicative that dropping of the IP packet is to be reported to both the source of the IP packet and a device other than the source of the IP packet (at the reporting address)). It is noted that, when the wildcard reporting flag is set such that dropping of the IP packet is to be reported only to a device other than the source of the IP packet, this may be considered to be a blocking of reporting of the dropping of the IP packet to the source of the IP packet. It is noted that the wildcard reporting flag may only be considered to be valid where the reporting address flag is set in a manner indicative that a reporting address is included.

It will be appreciated that, although primarily presented herein as including specific information communicated in a specific ways (e.g., using particular fields, values, and or like), the IP fragmentability header may include other information (e.g., less or more, as well as different, information), may communicate the information in other ways, or the like, as well as various combinations thereof.

As indicated above and discussed further below, a device that includes a packet fragmentation control element 130 may be configured to handle an IP packet including an IP fragmentability header. An example embodiment of a method for use by a network element to handle an IP packet including an IP fragmentability header is presented with respect to FIG. 2.

Figure 2:
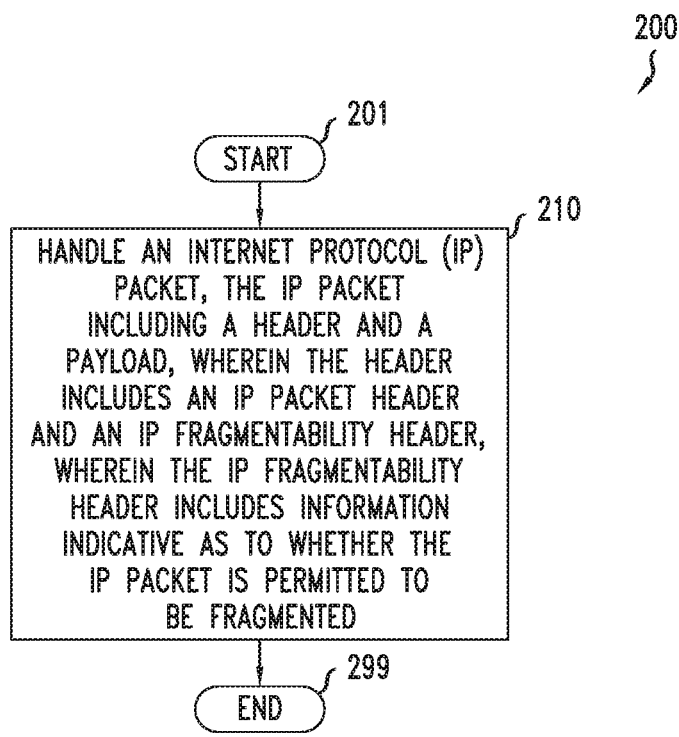
FIG. 2 depicts an example embodiment of a method for use by a network element to support control over fragmentation of IP packets.

FIG. 2 depicts an example embodiment of a method for use by a network element to support control over fragmentation of IP packets. It will be appreciated that, although primarily presented as being performed serially, at least a portion of the functions of method 200 may be performed contemporaneously or in a different order than as presented in FIG. 2. At block 201, method 200 begins. At block 210, the network element handles an IP packet including a payload and a header, wherein the header includes an IP packet header and an IP fragmentability header, wherein the IP fragmentability header includes information indicative as to whether the IP packet is permitted to be fragmented. It will be appreciated that the IP fragmentability header also may include additional information (e.g., information indicative as to whether dropping of the IP packet is to be reported, information for reporting dropping of the IP packet when dropping of the IP packet is to be reported, or the like, as well as various combinations thereof). It will be appreciated that the handling of the IP packet may depend on the role of the network element, such as whether the network element is a source network element (e.g., example embodiments of which are presented with respect to FIG. 3), a transit network element (e.g., example embodiments of which are presented with respect to FIG. 4), or a destination network element (e.g., example embodiments of which are presented with respect to FIG. 5). At block 299, method 200 ends.

As indicated above and discussed further below, a device that includes a packet fragmentation control element 130 may be configured to handle an IP packet including an IP fragmentability header, where the handling of the IP packet that is performed by the device depends on the role being performed by the device within the context of the communication path 111.

In at least some embodiments, a device that includes a packet fragmentation control element 130 and that is operating as a source network element for an IP packet (e.g., source communication endpoint 110-S) may be configured to generate a header including the IP fragmentability header, associate the header with a payload to form an IP packet, and send the IP packet toward a network element. The header may include the IP fragmentability header in addition to the IP header. The payload may be generated by the source network element, received by the source network element, or the like. The network element toward which the IP packet is sent may be a downstream network hop along the communication path for the IP packet. An example embodiment of a method for use by a source network element to handle an IP packet including an IP fragmentability header is presented with respect to FIG. 3.

Figure 3:
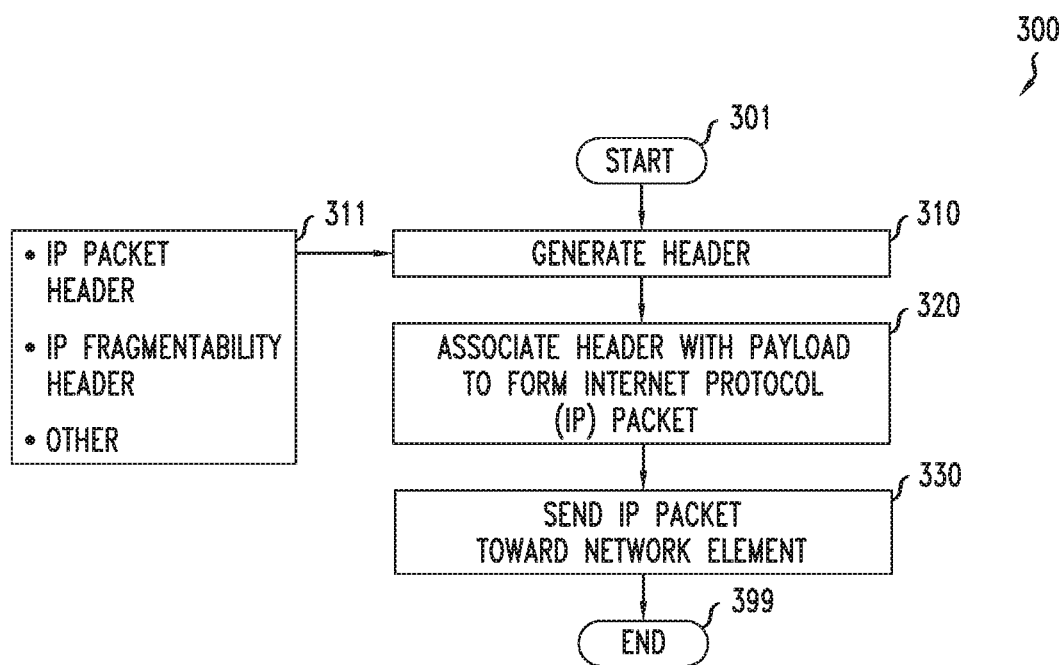
FIG. 3 depicts an example embodiment of a method for use by a source network element to support control over fragmentation of IP packets.

FIG. 3 depicts an example embodiment of a method for use by a source network element to support control over fragmentation of IP packets. It will be appreciated that, although primarily presented as being performed serially, at least a portion of the functions of method 300 may be performed contemporaneously or in a different order than as presented in FIG. 3. At block 301, method 300 begins. At block 310, the network element generates a header. As indicated by block 311, the header may include an IP packet header, an IP fragmentability header, or the like. At block 320, the network element associates the header with a payload to from an IP packet. At block 330, the network element sends the IP packet toward a network element (e.g., a network hop along the communication path). At block 399, method 300 ends.

It will be appreciated that a device that includes a packet fragmentation control element 130 and that is operating as a source network element for an IP packet may be configured to support various other functions for support control over fragmentation of IP packets.

In at least some embodiments, a device that includes a packet fragmentation control element 130 and that is operating as a transit network element for an IP packet (e.g., a router 121) may be configured to receive an IP packet including a header (including an IP packet header and an IP fragmentability header) and a payload and handle the IP packet based on the header (based on the IP packet header and, optionally, based on the IP fragmentability header). The IP packet may be received from an upstream network hop along the communication path for the IP packet. The IP packet may be an original IP packet that has not been previously fragmented or an IP fragment of an original IP packet that was previously fragmented to form the IP fragment. The handling of the IP packet may include forwarding the IP packet, dropping the IP packet, fragmenting the IP packet into IP fragments and forwarding the IP fragments, or the like). The handling of the IP packet based on the header is discussed further below.

The handing of the IP packet based on the IP fragmentability header may include determining a packet size of the IP packet, determining a next hop for the IP packet (e.g., based on the IP packet header of the IP packet), determining an MTU size of the next hop for the IP packet, and determining handling of the IP packet (e.g., whether to forward the IP packet, drop the IP packet, fragment the IP packet into IP fragments and forward the IP fragments, or the like) based on the packet size of the IP packet, the MTU size of the next hop for the IP packet, and the IP fragmentability header.

The handing of the IP packet based on the IP fragmentability header may include forwarding the IP packet, toward the next hop for the IP packet, based on a determination that the packet size of the IP packet satisfies the MTU size of the next hop for the IP packet (e.g., MTU size is greater than or equal to the packet size of the IP packet).

The handing of the IP packet based on the IP fragmentability header may include dropping the IP packet based on a determination that the packet size of the IP packet does not satisfy the MTU size of the next hop for the IP packet (e.g., MTU size is less than the packet size of the IP packet) and a determination that the IP fragmentability header includes IP fragmentability information indicative that fragmentation of the IP packet is not permitted.

The handing of the IP packet based on the IP fragmentability header may include sending one or more reporting messages based on a determination that the IP packet has been dropped. The sending of a reporting message based on a determination that the IP packet has been dropped may include determining whether the IP fragmentability header includes a reporting address and sending the reporting message based on the determination as to whether the IP fragmentability header includes a reporting address. The reporting message may be sent toward a reporting address based on a determination that the IP fragmentability header includes a reporting address. The reporting message may be sent toward a source of the IP packet (e.g., a source address of the IP packet header of the IP packet) based on a determination that the IP fragmentability header does not include a reporting address. The reporting message may be sent toward both a reporting address (of a device other than the source of the IP packet) and the source of the IP packet based on a determination that the IP fragmentability header includes a reporting address and that the wildcard reporting flag is set in a manner indicative that the reporting message is to be provided to the source of the IP packet in addition to the reporting address (e.g., the wildcard reporting flag is set to "1"). The reporting message may include an indication that the IP packet has been dropped. The reporting message may be an Internet Control Message Protocol (ICMP) error message where the IP packet is an IPv4 packet, an ICMPv6 error message (e.g., a Packet Too Big (PTB) message) where the IP packet is an IPv6 packet, or the like.

The handing of the IP packet based on the IP fragmentability header may include fragmenting the IP packet, based on a determination that the packet size of the IP packet does not satisfy the MTU size of the next hop for the IP packet (e.g., MTU size is less than the packet size of the IP packet) and a determination that the IP fragmentability header includes IP fragmentability information indicative that fragmentation of the IP packet is permitted, to form a set of IP fragments and forwarding the IP fragments toward the next hop for the IP packet. The fragmentation of the IP packet may include an initial fragmentation (where the IP packet is an original IP packet that has not been previously fragmented) or a re-fragmentation (where the IP packet is an IP fragment of an original IP packet that was previously fragmented to form the IP fragment).

The handing of the IP packet based on the IP fragmentability header may include reassembling an original IP packet where the IP packet is a fragment of the original IP packet and the destination network element does not support use of the IP fragmentability header or IP fragmentation and reassembly. This may be performed by a gateway router which is associated with a destination network element and, thus, which is a transit router along the path to the destination network element. In at least some embodiments, for example, a gateway router may support a policy to match the destination IP address of the IP packet and the source IP address of the source of the IP packet in order to selectively reassemble an original IP packet from a set of two or more IP fragments and provide the original (reassembled) IP packet to the destination network element.

The handing of the IP packet by the transit network element based on the header may include various other functions.

It will be appreciated that a device that includes a packet fragmentation control element 130 and that is operating as a transit network element for an IP packet may be configured to provide various other functions for supporting handling of an IP packet that includes an IP fragmentability header. An example embodiment of a method for use by a transit network element to handle an IP packet including an IP fragmentability header is presented with respect to FIG. 4.

Figure 4:
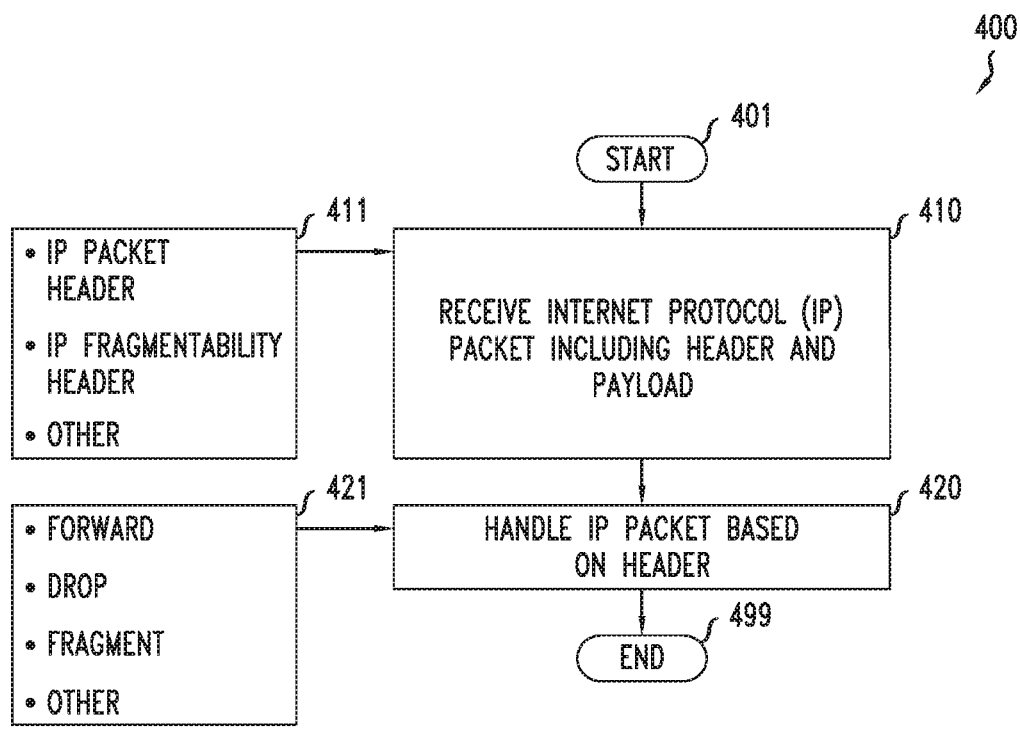
FIG. 4 depicts an example embodiment of a method for use by a transit network element to support control over fragmentation of IP packets.

FIG. 4 depicts an example embodiment of a method for use by a transit network element to support control over fragmentation of IP packets. It will be appreciated that, although primarily presented as being performed serially, at least a portion of the functions of method 400 may be performed contemporaneously or in a different order than as presented in FIG. 4. At block 401, method 400 begins. At block 410, the network element receives an IP packet including a header and a payload. As indicated by block 411, the header may include an IP packet header, an IP fragmentability header, or the like. At block 420, the network element handles the IP packet based on the header. As indicated by block 421, the handling of the IP packet based on the header may include forwarding the IP packet, dropping the IP packet, fragmenting the IP packet (e.g., original fragmentation or re-fragmentation where the IP packet is an IP fragment of an original IP packet that was previously fragmented to form the IP fragment), reassembling an original IP packet (e.g., where the IP packet is a fragment of the original IP packet and the destination network element does not support use of the IP fragmentability header or does not support IP fragmentation and reassembly), or the like. At block 499, method 400 ends.

It will be appreciated that a device that includes a packet fragmentation control element 130 and that is operating as a transit network element for an IP packet may be configured to support various other functions for support control over fragmentation of IP packets.

In at least some embodiments, a device that includes a packet fragmentation control element 130 and that is operating as a destination network element for an IP packet (e.g., destination communication endpoint 110-D) may be configured to receive an IP packet including a header (including an IP packet header and an IP fragmentability header) and a payload and handle the IP packet based on the header (based on the IP packet header and, optionally, based on the IP fragmentability header). The IP packet may be received from an upstream network hop along the communication path for the IP packet. The IP packet may be an original IP packet that has not been previously fragmented or an IP fragment of an original IP packet that was previously fragmented to form the IP fragment.

The handling of the IP packet may include processing the IP packet where the IP packet is an original IP packet that has not been previously fragmented.

The handling of the IP packet may include reassembling an original IP packet where the IP packet is an IP fragment of an original IP packet that was previously fragmented to form the IP fragment, or the like.

The handing of the IP packet by the destination network element based on the header may include various other functions.

It will be appreciated that a device that includes a packet fragmentation control element 130 and that is operating as a destination network element for an IP packet may be configured to provide various other functions for supporting handling of an IP packet that includes an IP fragmentability header. An example embodiment of a method for use by a destination network element to handle an IP packet including an IP fragmentability header is presented with respect to FIG. 5.

Figure 5:
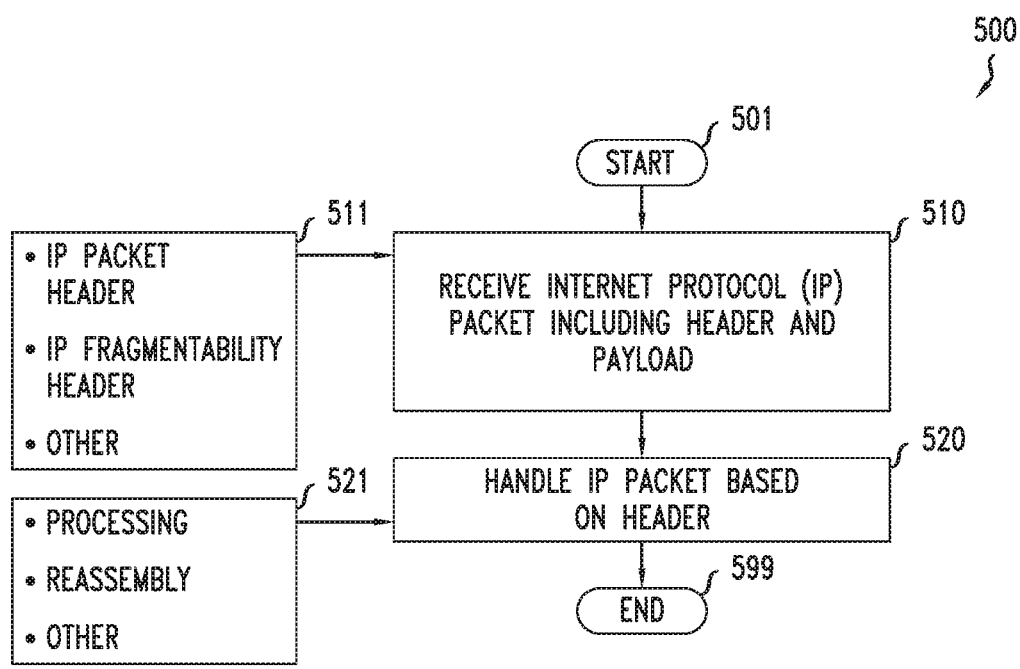
FIG. 5 depicts an example embodiment of a method for use by a destination network element to support control over fragmentation of IP packets.

FIG. 5 depicts an example embodiment of a method for use by a destination network element to support control over fragmentation of IP packets. It will be appreciated that, although primarily presented as being performed serially, at least a portion of the functions of method 500 may be performed contemporaneously or in a different order than as presented in FIG. 5. At block 501, method 500 begins. At block 510, the network element receives an IP packet including a header and a payload. As indicated by block 511, the header may include an IP packet header, an IP fragmentability header, or the like. At block 520, the network element handles the IP packet based on the header. As indicated by block 521, the handling of the IP packet based on the header may include processing the IP packet, reassembling an original IP packet (e.g., where the IP packet is an IP fragment of an original IP packet that was previously fragmented to form the IP fragment), or the like. At block 599, method 500 ends.

It will be appreciated that a device that includes a packet fragmentation control element 130 and that is operating as a destination network element for an IP packet may be configured to support various other functions for supporting control over fragmentation of IP packets.

It will be appreciated that various example embodiments presented herein for supporting control over fragmentation of IP packets, including handling of IP packets that include IP fragmentability headers, may be further understood by considering various example embodiments configured to support control over fragmentation of IPv6 packets.

In at least some embodiments, where the IP packet is an IPv6 packet, the IP fragmentability header may be provided as an IPv6 Extended Header (EH). The IPv6 EH that is used to provide the IP fragmentability header may be referred to herein as an IPv6 Fragmentability Header. The IPv6 Fragmentability Header may be defined using a new EH Type allocated from the IPv6 Registry by the Internet Assigned Numbers Authority (e.g., a value of 145 is proposed; however, it will be appreciated that other suitable values may be used).

Figure 6:
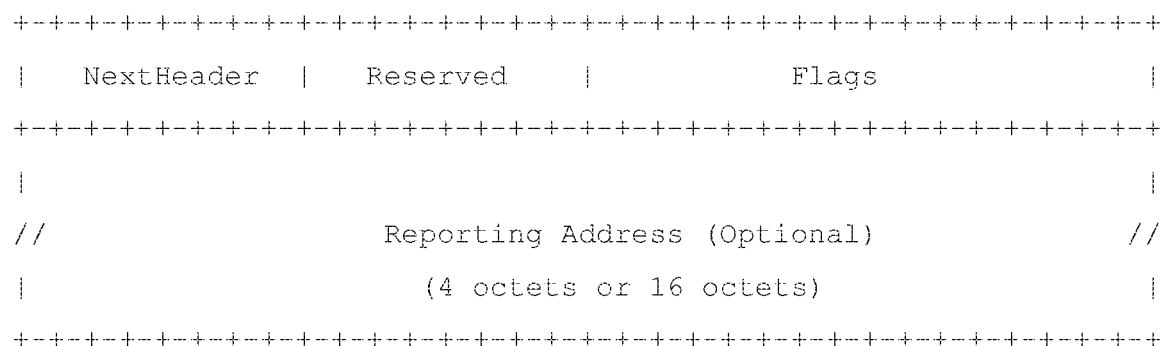
FIG. 6 depicts an example embodiment of an IPv6 Fragmentability Header.

In at least some embodiments, the IP fragmentability header may have the format depicted in FIG. 6 (e.g., when implemented as an IPv6 Fragmentability Header).

As depicted in FIG. 6, the IPv6 Fragmentability Header includes a NextHeader field, a Reserved field, a Flags field, and, optionally, a Reporting Address field. If a Reporting Address is not included, then the IPv6 Fragmentability Header is 4 octets. If a Reporting Address is included, then the IPv6 Fragmentability Header is either 8 octets (including a 4-octet IPv4 address) or 20 octets (including a 16-octet IPv6 address).

The NextHeader field of the IPv6 Fragmentability Header is an 8-bit selector that identifies the type of header immediately following the IPv6 Fragmentability Header.

The Reserved field of the IPv6 Fragmentability Header is an 8-bit field that is unused and reserved for future use. The Reserved field is unset on transmission and ignored on receipt.

The Flags field of the IPv6 Fragmentability Header is a 16-bit field that supports various flags, including a Don't Fragment (DF) Flag, an Address (A) Flag, an Address Version (V) Flag, a Wildcard (W) Flag, and an Unused (U)

set of bits. The Flags field of the IPv6 Fragmentability Header may be formatted as depicted in FIG. 7.

Figure 7:
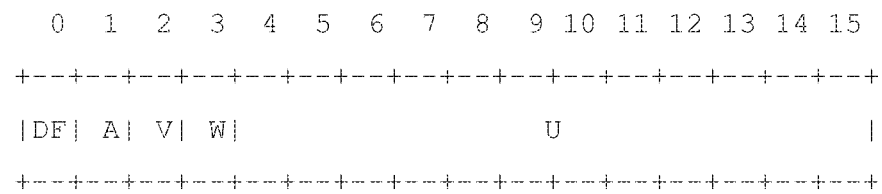
FIG. 7 depicts an example embodiment of a Flags field of an IPv6 Fragmentability Header.

As depicted in FIG. 7, the Flags field of the IPv6 Fragmentability Header includes a DF Flag, an A Flag, a V Flag, a W Flag, and an Unused (U) set of bits.

The DF Flag (or bit) is configured to provide an indication as to whether the IP packet in which the IPv6 Fragmentability Header is included is permitted to be fragmented. For example, a value of "0" (which may be considered to be "not set") may be indicative that the IP packet is permitted to be fragmented and a value of "1" (which may be considered to be "set") may be indicative that the IP packet is not permitted to be fragmented (although it will be appreciated that other values may be used). It will be appreciated that (1) if the DF bit is not set and fragmentation is needed in order to route the IP packet, the IP packet is fragmented and (2) if the DF bit is set and fragmentation is needed in order to route the IP packet, the IP packet is dropped.

The A Flag (or bit) is configured to provide an indication as to whether the IPv6 Fragmentability Header includes a Reporting Address in the Reporting Address field. For example, a value of "0" (which may be considered to be "not set") may be indicative that the IPv6 Fragmentability Header does include a Reporting Address (and, thus, does not include the Reporting Address field) and a value of "1" (which may be considered to be "set") may be indicative that the IPv6 Fragmentability Header includes a Reporting Address in the Reporting Address field (although it will be appreciated that other values may be used).

The V Flag (or bit) is configured to provide an indication of the address version of the Reporting Address in the Reporting Address field when the IPv6 Fragmentability Header includes a Reporting Address (i.e., this bit has significance when the A Flag is set). For example, a value of "0" may be indicative that the Reporting Address in the Reporting Address field is an IPv6 address and a value of "1" may be indicative that the Reporting Address in the Reporting Address field is an IPv4 address (although it will be appreciated that other values may be used).

The W Flag (or bit) is configured to provide an indication of wildcard reporting, which means whether dropping of the IP packet is to be reported only to the Reporting Address in the Reporting Address field or whether the dropping of the IP packet is be reported to both the Reporting Address in the Reporting Address field as well as to the source IP address of the IP packet. The W Flag may be considered to be valid only if the A Flag is set (meaning that a Reporting Address is included in the IPv6 Fragmentability Header). For example, a value of "0" (which may be considered to be "not set") may be indicative that dropping of the IP packet is to be reported only to the Reporting Address in the Reporting Address field and a value of "1" (which may be considered to be "set") may be indicative that dropping of the IP packet is to be reported to both the Reporting Address in the Reporting Address field as well as to the source IP address of the IP packet (although it will be appreciated that other values may be used).

The Unused (U) bits includes 12 bits available for future use. The U bits are unset (e.g., "0") on transmission and ignored on reception. It will be appreciated that, in the future, additional Flags may be defined by allocating the U bits.

The Reporting Address field of the IPv6 Fragmentability Header, if present, includes a Reporting Address. The Reporting Address may be used as a destination address for reporting messages that are sent when the IP packet including the IPv6 Fragmentability Header is dropped. For example, reporting messages may be ICMPv6 error messages (e.g., a PTB message) where the IP packet is an IPv6 packet or ICMP error messages where the IP packet is an IPv4 packet. For example, it is possible that the source of the IPv6 packet may not want to receive IPv6 error messages. For example, it is possible that the source address of the IPv6 packet may not be reachable in the backward path, in which case the Reporting Address could be a reachable loopback address of the source of the IPv6 packet. For example, the source of the IPv6 packet may block ICMPv6 messages for security reasons, in which case the Reporting Address could be a IP address of a device (e.g., a server, a controller (e.g., a software defined networking (SDN) controller), or the like) that logs ICMPv6 notifications in the network. It will be appreciated that the Reporting Address may be used for reporting dropping of IPv6 packets for various other reasons. It will be appreciated that other types of reporting messages may be sent to the Reporting Address.

The IPv6 Fragmentability Header may be originated by various devices (e.g., the source of the IPv6 packet, a gateway associated with the source of the IPv6 packet, a transit router supporting routing of the IPv6 packet, or the like). In at least some embodiments, by default, the originator of an IPv6 packet can include the IPv6 Fragmentability Header. In at least some embodiments, to retain existing IPv6 behavior, the originator of the IPv6 Fragmentability Header may set the DF bit to "1" (e.g., no fragmentation is allowed in the transit of this IPv6 packet). In at least some embodiments, the originator of the IPv6 Fragmentability Header may set the DF bit to "0" (e.g., forwarding fragmentation by a transit router is permitted for this IPv6 packet). In at least some embodiments, if the originator of the IPv6 Fragmentability Header prefers the ICMPv6 messages originated by a transit router to be sent to an IP address other than the Source Address in the IPv6 Header, then the originator of the IPv6 Fragmentability Header may include an optional Reporting Address in the IPv6 Fragmentability Header while also setting the A bit to indicate the presence of the Reporting Address in the IPv6 Fragmentability Header. In at least some embodiments, if the originator of the IPv6 Fragmentability Header prefers the ICMPv6 messages originated by a transit router to be sent to both to the Source Address in the IPv6 Header as well as to another IP address, then the originator of the IPv6 Fragmentability Header may include the optional Reporting Address in the IPv6 Fragmentability Header while also setting A and W bits to indicate the desired action. In at least some embodiments, as indicated above, the originator of the IPv6 Fragmentability Header may be a device other than the source of the IPv6 packet (e.g., a gateway associated with a source of the IPv6 packet or a first transit router on the path of the IPv6 packet where the source of the IPv6 packet is not configured to support insertion of the IPv6 Fragmentability Header). In at least some embodiments, if a gateway receives an IPv6 packet without an IPv6 Fragmentability Header then the gateway may add an IPv6 Fragmentability Header to the IPv6 packet, before forwarding the IPv6 packet, based on use of a policy (e.g., a policy that is based on the source address of the IPv6 packet) that is configured to support selective insertion of the IPv6 Fragmentability Header into the IPv6 packet received from the source of the IPv6 packet where the source of the IPv6 packet does not support use of the IPv6 Fragmentability Header and the downstream network (e.g., transit routers) support forward fragmentation of IPv6 packets. It will be appreciated that origination of the IPv6 Fragmentability Header by various devices may be based on various other functions which may be supported by the various devices for originating IPv6 Fragmentability Headers for IPv6 packets.

The IPv6 Fragmentability Header may be processed by various devices (e.g., a gateway associated with the source of the IPv6 packet, a transit router supporting routing of the IPv6 packet, a gateway associated with a destination of the IPv6 packet, a destination of the IPv6 packet, or the like). In at least some embodiments, if a transit router receives an IPv6 Packet with an IPv6 Fragmentability Header, then the transit router retains the IPv6 Fragmentability Header in the IPv6 packet when forwarding the IPv6 packet. In at least some embodiments, a transit router may modify the received DF bit (e.g., overriding the value of the DF bit set by a device upstream on the path). In at least some embodiments, if a transit router receives a Reporting Address in the IPv6 Fragmentability Header, then the transit router may not be permitted to modify the Reporting Address. In at least some embodiments, if a transit router does not receive a Reporting Address in the IPv6 Fragmentability Header, then the transit router may insert a Reporting Address and set the A bit to indicate the inclusion of the Reporting Address in the IPv6 Fragmentability Header. In at least some embodiments, if a transit router receives an IPv6 Fragmentability Header with the DF bit set (e.g., in a manner indicating that fragmentation is not permitted, such as to a value of "1") and the next-hop MTU is less than the size of the IPv6 packet to be transmitted, then the transit router drops the IPv6 packet. In at least some embodiments, a transit router may originate an ICMPv6 PTB message (e.g., using procedures described in RFC 4443) when the IPv6 packet is dropped, where the ICMPv6 PTB message may be sent to a Reporting Address in the IPv6 Fragmentability Header where the IPv6 Fragmentability Header includes a Reporting Address, may be sent to the Source Address specified in the IPv6 Header where the IPv6 Fragmentability Header does not include a Reporting Address, or may be sent to both a Reporting Address in the IPv6 Fragmentability Header and to the Source Address specified in the IPv6 Header where the IPv6 Fragmentability Header includes a Reporting Address and the Wildcard bit is set. In at least some embodiments, if a transit router receives an IPv6 Fragmentability Header with the DF bit unset (e.g., in a manner indicating that fragmentation is permitted, such as to a value of "0") and the next-hop MTU is less than the size of the IPv6 packet to be transmitted, then the transit router performs fragmentation of the IPv6 packet (e.g., using procedures described in Section 4.5 in RFC 2460, with the exception that the "source" in RFC 2460 is to be replaced by "transit router" as discussed herein) such that each resulting IPv6 Fragment includes the IPv6 Fragmentability Header from the original IPv6 packet (e.g., with the IPv6 Fragmentability Header preceding the IPv6 Fragment Header that gets added to each resulting IPv6 Fragment). In at least some embodiments, if a transit router is a gateway to a destination network element that cannot perform reassembly to reassemble an original IP packet (e.g., the destination network element does not support use of the IPv6 Fragmentability Header or does not support IP fragmentation and reassembly), the transit router may reassemble an original IP packet from a set of IPv6 Fragments and send the reassembled original IP packet to the destination network element. It will be appreciated that processing of the IPv6 Fragmentability Header by various devices may be based on various other functions which may be supported by the various devices for processing IPv6 packets including IPv6 Fragmentability Headers.

It will be appreciated that the IPv6 Fragmentability Header may be handled by various devices in various other ways.

The fragmentation of an IPv6 packet based on an IPv6 Fragmentability Header may be further understood with respect to the following example.

In this example, assume that an IPv6 packet including an IPv6 Fragmentability Header is received by a transit node and fragmented by the transit node based on an indication in the IPv6 Fragmentability Header that fragmentation of the IPv6 packet is permitted. In this example, further assume that the IPv6 Fragmentability Header of the IPv6 packet includes a Reporting Address. Namely, the Flags field of the IPv6 Fragmentability Header may include the following flags set as follows: DF=0 (indicative that fragmentation is permitted), A=1 (indicative that a Reporting Address is provided), V=0 (indicative that the Reporting Address is an IPv6 address), W=0 (indicative that wildcard reporting is not being used). In this example, the total size of the IPv6 packet is 1320 octets, including 40 octets for the IPv6 Header, 20 octets for the IPv6 Fragmentability Header, and 1260 octets of payload (the portion of the IPv6 packet to be fragmented).

Figure 8B:
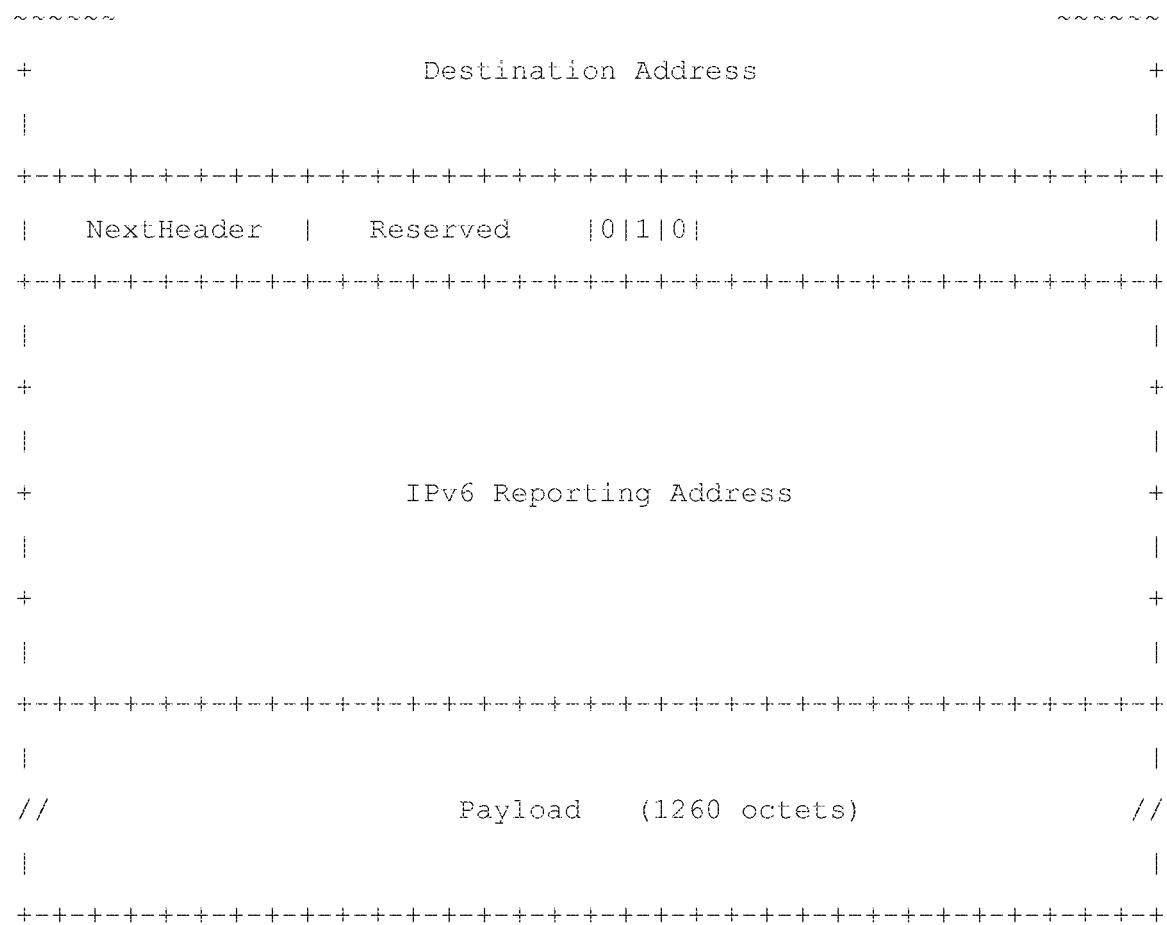

In this example, the IPv6 packet that is to be fragmented based on the IPv6 Fragmentability Header may be formatted as depicted in FIGS. 8A and 8B.

As depicted in FIGS. 8A and 8B, the IPv6 packet includes a payload, the IPv6 Fragmentability Header, and the IPv6 Header. The payload includes 1260 octets of data. The IPv6 Fragmentability Header, which is located adjacent to the payload, includes the NextHeader, Reserved, Flags, and IPv6 Reporting Address fields. The IPv6 Header, which is located adjacent to the IPv6 Fragmentability Header, includes the Version, Traffic Class, Flow Label, Payload Length, NextHeader, Hop Limit, Source Address, and Destination Address fields. It is noted that the Payload Length field of the IPv6 Header also accounts for EHs which follow the IPv6 Header which, in this case, includes the IPv6 Fragmentability Header (illustratively, the Payload Length field indicates 1280 octets, which includes the 1260 octets of the payload and the 20 octets of the IPv6 Fragmentability Header).

Figure 9B:
Figure 10B:
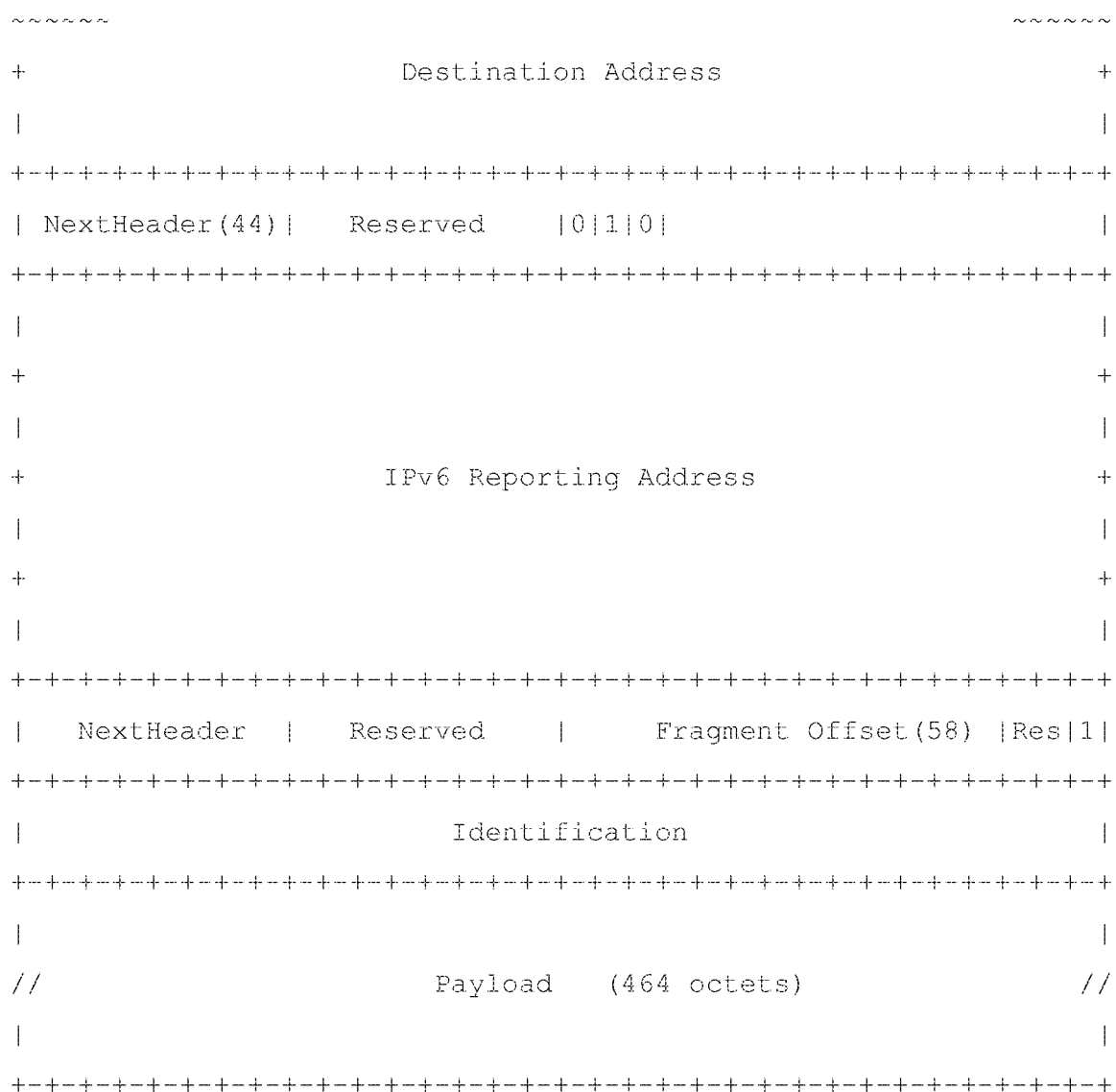
Figure 11B:

In this example, assume that the IPv6 packet that is to be fragmented is being sent over a link having an MTU of 532 octets. This requires the IPv6 packet (having an original payload of 1260 bytes) to be split into three IP Fragments (e.g., having payloads of 464 octets, 464 octets, and 332 octets, respectively). The IP Fragments formed from fragmentation of the IPv6 packet each include an IPv6 Header (e.g., reusing portions of IPv6 header of the IPv6 packet), an IPv6 Fragmentability Header (e.g., reusing the IPv6 Fragmentability Header of the IPv6 packet), an IPv6 Fragment header, and a payload (including a respective portion of the payload of the IPv6 packet), respectively. In this example, the three IP Fragments formed from fragmentation of the IPv6 packet that may be formatted as depicted in FIGS. 9A and 9B (for the first IP fragment), FIGS. 10A and 10B (for the second IP fragment), and FIGS. 11A and 11B (for the third IP fragment).

As depicted in FIGS. 9A and 9B, FIGS. 10A and 10B, and FIGS. 11A and 11B, the three IP fragments each include an IPv6 Header (e.g., reusing portions of IPv6 header of the IPv6 packet, such as the source address and the destination address), an IPv6 Fragmentability Header (e.g., reusing the IPv6 Fragmentability Header of the IPv6 packet), an IPv6 Fragment header, and a payload (including a respective portion of the payload of the IPv6 packet), respectively.

The three IP Fragments each include an IPv6 Header, as each of the three IP Fragments is an IP packet to be routed as the IPv6 packet would have been routed if not fragmented. The IPv6 Header of each of the three IP Fragments includes the Version, Traffic Class, Flow Label, Payload Length, NextHeader, Hop Limit, Source Address, and Destination Address fields. The source and destination addresses are the same in the three IP Fragments (including the source IP address and destination IP address from the IPv6 Header of the IPv6 packet). The Payload Length values may vary across the three IP Fragments (illustratively, in this example the Payload Length values of the three IP Fragments are 492 octets, 492 octets, and 360 octets, respectively). The NextHeader values of the three IP Fragments are the same (illustratively, 145 octets, which includes 20 octets of the IP Fragmentability Header and 125 octets of the IP Fragment Header since these two headers are included in each of the IP Fragments).

The IPv6 Fragmentability Header of each of the three IP Fragments includes the NextHeader, Reserved, Flags, and IPv6 Reporting Address fields. The values of these fields may be identical in the three IP Fragments. The values of these fields may be identical to the corresponding values in the IPv6 Fragmentability Header of the IPv6 packet or values of some of the fields may be different than the corresponding values in the IPv6 Fragmentability Header of the IPv6 packet. For example, while fragmentation of the IPv6 packet is permitted (namely, the DF Flag was set to "0" in the IPv6 Fragmentability Header of the IPv6 packet), further fragmentation of the resulting IP Fragments may be permitted or denied (in this example, further fragmentation is permitted and, thus, the DF Flag is set to "0" in the IPv6 Fragmentability Headers each of the IP Fragments). For example, since the IPv6 Fragmentability Header of the IPv6 packet includes a Reporting Address, the Reporting Address is retained in the IPv6 Fragmentability Headers in each of the IP Fragments (although it will be appreciated that, if the IPv6 Fragmentability Header of the IPv6 packet did not include a Reporting Address, a Reporting Address could be added to any or all of the IP Fragments by setting the A Flag and inserting the Reporting Address in the IPv6 Fragmentability Header(s) of the IP Fragment(s) for which the Reporting Address is to be added).

The IP Fragment Header of each of the three IP Fragments includes the NextHeader, Reserved, Fragment Offset, Res, M Flag, and Identification fields (as defined in Section 4.5 of RFC 2460). In the first IP Fragment, the Fragment Offset is set to 0, the More Fragments (M Flag) is set (since there are two more IP Fragments transporting portions of the original IPv6 packet), and the total length of the first IP fragment would be 532 octets (including 40 octets for the IPv6 Header, 20 octets for the Fragmentability Header, 8 octets for the IP Fragment Header, and 464 octets of payload). In the second IP Fragment, the Fragment Offset is set to 58 (58×8=464, which indicates the offset of 464 octets in the original payload that was included in the first IP Fragment), the More Fragments (M Flag) is set (since there is one more IP Fragment transporting portions of the original IPv6 packet), and the total length of the second IP Fragment would be 532 octets (including 40 octets for the IPv6 Header, 20 octets for the Fragmentability Header, 8 octets for the IP Fragment Header, and 464 octets of payload). In the third IP Fragment, the Fragment Offset is set to 116 (116×8=928, which indicates the offset of 928 octets in the original payload that was included in the first IP Fragment and the second IP Fragment), the More Fragments (M Flag) is clear (since this is the last IP Fragment transporting portions of the original IPv6 packet), and the total length of the third IP Fragment would be 400 octets (including 40 octets for the IPv6 Header, 20 octets for the Fragmentability Header, 8 octets for the IP Fragment Header, and 332 octets of payload).

The refragmentation of an IP Fragment based on an IPv6 Fragmentability Header may be further understood with respect to the following example.

In this example, assume that an IP Fragment including an IPv6 Fragmentability Header is received by a transit node and refragmented by the transit node based on an indication in the IPv6 Fragmentability Header that fragmentation of the IP Fragment is permitted. In this example, further assume that the IPv6 Fragmentability Header of the IP Fragment includes a Reporting Address. Namely, the Flags field of the IPv6 Fragmentability Header may include the following flags set as follows: DF=0 (indicative that fragmentation is permitted), A=1 (indicative that a Reporting Address is provided), V=0 (indicative that the Reporting Address is an IPv6 address), and W=0 (indicative that wildcard reporting is not being used). In this example, the total size of the IP Fragment is 580 octets, including 40 octets for the IPv6 Header, 20 octets for the IPv6 Fragmentability Header, 8 octets for the IP Fragment Header, and 512 octets of payload (the portion of the IP Fragment to be fragmented).

In this example, the IP Fragment that is to be fragmented based on the IPv6 Fragmentability Header may be formatted as depicted in FIGS. 12A and 12B.

As depicted in FIGS. 12A and 12B, the IP Fragment includes a payload, the IP Fragment Header, the IPv6 Fragmentability Header, and the IPv6 Header. The payload includes 512 octets of data. The IPv6 Fragment Header, which is located adjacent to the payload, includes the NextHeader, Reserved, Fragment Offset, Res, M Flag, and Identification fields (as defined in Section 4.5 of RFC 2460). The IPv6 Fragmentability Header, which is located adjacent to the IP Fragment Header, includes the NextHeader, Reserved, Flags, and IPv6 Reporting Address fields. The IPv6 Header, which is located adjacent to the IPv6 Fragment Header, includes the Version, Traffic Class, Flow Label, Payload Length, NextHeader, Hop Limit, Source Address, and Destination Address fields. It is noted that the Payload Length field of the IPv6 Header also accounts for EHs which follow the IPv6 Header which, in this case, includes the IPv6 Fragmentability Header and the IP Fragment Header (illustratively, the Payload Length field indicates 540 octets, which includes the 512 octets of the payload, the 8 octets for the IP Fragment Header, and the 20 octets of the IPv6 Fragmentability Header).

Figure 14B:

In this example, assume that the IP Fragment that is to be refragmented is being sent over a link having an MTU of 532 octets. This requires the IP Fragment to be split into two IP Fragments (e.g., having payloads of 464 octets and 48 octets, respectively). The IP Fragments formed from refragmentation of the IP Fragment each include an IPv6 Header (e.g., reusing portions of IPv6 header of the IP Fragment), an IPv6 Fragmentability Header (e.g., reusing the IPv6 Fragmentability Header of the IP Fragment), an IPv6 Fragment header, and a payload (including a respective portion of the payload of the IP Fragment), respectively. In this example, the two IP Fragments formed from fragmentation of the IPv6 packet that may be formatted as depicted in FIGS. 13A and 13B (for the first IP fragment) and FIGS. 14A and 14B (for the second IP fragment).

As depicted in FIGS. 13A and 13B and FIGS. 14A and 14B, the two IP Fragments each include an IPv6 Header (e.g., reusing portions of IPv6 Header of the received IP Fragment, such as the source address and the destination address), an IPv6 Fragmentability Header (e.g., reusing the IPv6 Fragmentability Header of the received IP Fragment), an IPv6 Fragment header, and a payload (including a respective portion of the payload of the received IP Fragment), respectively.

The two IP Fragments each include an IPv6 Header, as each of the two IP Fragments is an IP packet to be routed as the received IP Fragment would have been routed if not refragmented. The IPv6 Header of each of the two IP Fragments includes the Version, Traffic Class, Flow Label, Payload Length, NextHeader, Hop Limit, Source Address, and Destination Address fields. The source and destination addresses are the same in the two IP Fragments (including the source IP address and destination IP address from the IPv6 Header of the received IP Fragment). The Payload Length values may vary across the two IP Fragments (illustratively, in this example the Payload Length values of the two IP Fragments are 492 octets and 76 octets, respectively). The NextHeader values of the two IP Fragments are the same (illustratively, 44 octets, which includes 20 octets of the IPv6 Fragmentability Header and 24 octets of the IP Fragment Header since these two headers are included in each of the IP Fragments).

The IPv6 Fragmentability Header of each of the two IP Fragments includes the NextHeader, Reserved, Flags, and IPv6 Reporting Address fields. The values of these fields may be identical in the two IP Fragments. The values of these fields may be identical to the corresponding values in the IPv6 Fragmentability Header of the received IP Fragment or values of some of the fields may be different than the corresponding values in the IPv6 Fragmentability Header of the received IP Fragment. For example, while refragmentation of the received IP Fragment is permitted (namely, the DF Flag was set to "0" in the IPv6 Fragmentability Header of the received IP Fragment), further refragmentation of the resulting IP Fragments may be permitted or denied (in this example, further fragmentation is permitted and, thus, the DF Flag is set to "0" in the IPv6 Fragmentability Headers each of the IP Fragments). For example, since the IPv6 Fragmentability Header of the received IP Fragment includes a Reporting Address, the Reporting Address is retained in the IPv6 Fragmentability Headers of each of the IP Fragments (although it will be appreciated that, if the IPv6 Fragmentability Header of the received IP Fragment did not include a Reporting Address, a Reporting Address could be added to any or all of the IP Fragments by setting the A Flag and inserting the Reporting Address in the IPv6 Fragmentability Header(s) of the IP Fragment(s) for which the Reporting Address is to be added).

The IPv6 Fragment Header of each of the two IP Fragments includes the NextHeader, Reserved, Fragment Offset, Res, M Flag, and Identification fields (as defined in Section 4.5 of RFC 2460). In the first IP Fragment, the Fragment Offset is set to 0, the More Fragments (M Flag) is set (since there is one more IP Fragment transporting portions of the received IP Fragment), and the total length of the first IP Fragment would be 532 octets (including 40 octets for the IPv6 Header, 20 octets for the Fragmentability Header, 8 octets for the IP Fragment Header, and 464 octets of payload). In the second IP Fragment, the Fragment Offset is set to 58 (58×8=464, which indicates the offset of 464 octets in the original payload that was included in the first IP Fragment), the More Fragments (M Flag) is clear (since this is the last IP Fragment transporting portions of the received IP Fragment), and the total length of the second IP Fragment would be 116 octets (including 40 octets for the IPv6 Header, 20 octets for the Fragmentability Header, 8 octets for the IP Fragment Header, and 48 octets of payload).

It will be appreciated that, although primarily presented herein with respect to embodiments for supporting control over forward fragmentation of IPv6 packets in communication networks, various example embodiments or variations thereof may be configured to support enhancements to forward fragmentation of IPv4 packets in communication networks (e.g., for controlling reporting of packet drops due to handling of fragmentation processing or the like). In at least some embodiments, for example, the IP fragmentability header that is used to support enhancements to forward fragmentation of IPv4 packets in communication networks may be identical to the IP fragmentability header presented hereinabove (e.g., including the DF flag (which may be set equal to the DF bit of the IPv4 packet header), the A Flag, the V Flag, the W Flag, the Reporting Address field, and so forth). In at least some embodiments, for example, the IP fragmentability header that is used to support enhancements to forward fragmentation of IPv4 packets in communication networks may be different than the IP fragmentability header presented hereinabove (e.g., it may omit the DF flag as the fragmentability may already be indicated in the DF bit in the IPv4 packet header, while including the A Flag, the V Flag, the W Flag, and the Reporting Address field that may be used to support various packet drop reporting features presented herein). It will be appreciated that various embodiments presented herein for processing of IPv6 packets including IP fragmentability headers may be applied or adapted for use in processing of IPv4 packets including IP fragmentability headers. It will be appreciated that various other functions may be provided for supporting enhancements to forward fragmentation of IPv4 packets in communication networks.

Various example embodiments for supporting control over fragmentation of packets in communication networks may be configured to provide various advantages or potential advantages.

For example, various example embodiments for supporting control over fragmentation of packets in communication networks may be configured to support forward fragmentation of IPv6 packets. For example, various example embodiments for supporting control over fragmentation of packets in communication networks may be configured to support forward fragmentation of IPv6 packets despite the fact that there are no unused fields available in the IPv6 Header for including of fragmentability information. For example, various example embodiments for supporting control over fragmentation of packets in communication networks may be configured to support forward fragmentation of IPv6 packets in a manner tending to overcome various problems typically associated with lack of forward fragmentation support in IPv6, at least some of which are discussed further below.

For example, various example embodiments for supporting control over fragmentation of packets in communication networks may be configured to support forward fragmentation of IPv6 packets in manner tending to overcome one or more problems associated with use of ICMPv6 PTB messages to inform a communication source that fragmentation is needed along the communication path (e.g., problems such as ICMPv6 filtering, ICMPv6 path asymmetry, or the like, as well as various combinations thereof).

For example, various example embodiments for supporting control over fragmentation of packets in communication networks may be configured to support forward fragmentation of IPv6 packets in manner tending to overcome problems associated with ICMPv6 filtering. Path MTU Discovery has been used to try to address lack of support for forward fragmentation of IPv6 packets. Path MTU Discovery is reliant on receiving ICMPv6 PTB messages from a transit router if the transit router finds a packet larger than the next-hop MTU; however, this is problematic due to the fact that there is widespread ICMPv6 packet filtering in the Internet. In IPv4, if the sender is willing to have a packet fragmented then it can clear the IPv4 DF bit before sending the packet so that the sender is not reliant of receiving an ICMP message to indicate a Path MTU problem; however, in IPv6, the default behavior is that fragmentation is not to be performed and, thus, fragmentation will be performed only if the original sender receives an ICMPv6 PTB message and fragments the packet into a size that meets the path MTU. As a result, when ICMPv6 PTB messages are filtered, then the large IPv6 packet is silently discarded within the network without any trace and, additionally, attempts by the sender to time out and resend the large IPv6 packet will meet with the same fate, thereby leading to a wedged state. This has been observed within various contexts, including within the context of the HTTP protocol where the path MTU is smaller than the MTU of the host systems at either end (e.g., the TCP handshake completes since none of the opening packets are large and the opening HTTP GET packet typically also makes it through as this is normally not a large pack; however, the first response may be a large packet and, if it is silently discarded due to the combination of fragmentation required and ICMPv6 filtering, then neither the client nor the server are capable of repairing the situation and the connection hangs). It is noted that support for forward fragmentation of IPv6 based on various embodiments for supporting control over fragmentation of packets may overcome at least some such problems.

For example, various example embodiments for supporting control over fragmentation of packets in communication networks may be configured to support forward fragmentation of IPv6 packets in manner tending to overcome problems associated with ICMPv6 path asymmetry. The ICMPv6 PTB message is typically sent backwards to the source from the interior of a network path; however, the ICMPv6 PTB message is one instance in the IP architecture where the IPv6 source address is interpreted by anything than the intended destination. The problem here includes path asymmetry, in that the source address may be unreachable from the point of the point of generation of the ICMPv6 message. There also may be a problem in the case of tunneling IP-in-IP as, since IPv6 fragmentation is performed at the source, it is not clear whether the ICMPv6 message should be sent to the tunnel ingress point or to the original source of the IPv6 packet. If the tunnel ingress is used, then this assumes that the tunnel egress performs packet reassembly, which can burden the tunnel egress. This may be further confounded in the cross protocol case of IPv6-in-IPv4 and IPv4-in-IPv6. It is noted that support for forward fragmentation of IPv6 based on various embodiments for supporting control over fragmentation of packets may overcome at least some such problems.

For example, various example embodiments for supporting control over fragmentation of packets in communication networks may be configured to support forward fragmentation of IPv6 packets in manner tending to overcome one or more problems associated with a combination of IPv6 packet fragmentation and non-TCP based applications. For example, UDP is an unreliable datagram delivery service, so a sender of a UDP packet is not expected to cache the packet and to be prepared to resend the packet. A UDP packet delivery error can only be effected at the level of the application, and not at the IP or UDP protocol level. In this case, it is not clear as to how a host should operate upon receipt of an ICMPv6 PTB message if resending the IP packet is not an option. Given that the sender does not cache sent UDP packets, the packet header in the ICMPv6 message is unhelpful. As the original packet was UDP, the sender does not necessarily have a connection state, so it is not clear how this information should be retained and how and when it should be used. As a result, a receiver may not be able to tell if an ICMPv6 PTB message is genuine. If the sender adds an entry into its local IPv6 forwarding table for state of an UDP packet, then it is exposing itself to a potential resource starvation problem. A high-volume flow of synthetic PTB messages has the potential to bloat the local IPv6 forwarding table. If the sender ignores the PTB message, then the application is left to attempt to recover the transaction. So, Path MTU Discovery may not have any significance to non-TCP based applications. The basic problem here is that the network was supposed to operate at the IP level and be completely unaware of transport. This implies that IP level fragmentation was meant to work in a manner that does not involve transport protocol interaction. It is noted that support for forward fragmentation of IPv6 based on various embodiments for supporting control over fragmentation of packets may overcome at least some such problems.

For example, various example embodiments for supporting control over fragmentation of packets in communication networks may be configured to support forward fragmentation of IPv6 packets in manner tending to overcome one or more problems associated with supporting Internet-of-Things (IoT) traffic based on IPv6. In IoT, a typical deployment scenario is one in which multiple IoT devices are aggregated by an access router which is connected to an aggregation router (e.g., via a wired or wireless (e.g., cellular, WiFi, or the like) interface). In order to avoid potential attacks to/from IoT devices, the communication between IoT devices and the rest of the network typically is highly secured. In some deployments, for example, communication between the access router and the aggregation router may use the Encapsulation Security Payload (ESP) format defined in RFC 4303 to encrypt and authenticate packets using Transport Mode. In some deployments, for example, tunnel-in-tunnel communications or virtual private network (VPN) communications may be used. The encryption and authentication of globally routed IPv4 and IPv6 packets may result in addition of various header fields to the IPv4 and IPv6 packets, thereby resulting in longer packets. For example, after encryption of a packet by the access router, the size of an IPv6 packet may increase due to addition of the ESP header, the ESP trailer, and Authentication Data. Additionally, the IPv6 packet can be further tunneled using various tunneling technologies over a Layer 2 VPN or a Layer 3 VPN, which further increases the overall size of the packet sent from the access router to the aggregation router. On the other-hand, the size of the MTU of the interface between the access router and the aggregation router could be relatively small, and may be less than the size of the encrypted IPv6 packet. If size of the IPv6 packet exceeds the MTU of interface between the access router and the aggregation router, the packet would be dropped since IPv6 does not currently support forward fragmentation. IoT devices typically block ICMPv6 in order to prevent denial-of-service (DoS)/distributed DoS (DDoS) attacks and, in such cases, Path MTU discovery (which otherwise would have enabled the originating IoT device to adjust the payload size originated at the application or transport layer such that the access router would be able to transmit the packet) does not work. Secondly, if the IoT device originated the packets from a non-TCP based application then the IoT device cannot adjust the size of the packet based on Path MTU Discovery. It is noted that support for forward fragmentation of IPv6 based on various embodiments for supporting control over fragmentation of packets may overcome at least some such problems.

For example, various example embodiments for supporting control over fragmentation of packets in communication networks may be configured to support control over fragmentation of IPv6 packet fragments of an IPv6 packet that has already been fragmented without a need to extend the IPv6 Fragment Header.

For example, various example embodiments for supporting control over fragmentation of packets in communication networks may be configured to support enhancements to forward fragmentation of IPv4 packets in communication networks (e.g., for controlling reporting of packet drops due to handling of fragmentation processing or the like).

Various example embodiments for supporting control over fragmentation of packets in communication networks may be configured to provide various other advantages or potential advantages.

Figure 15:
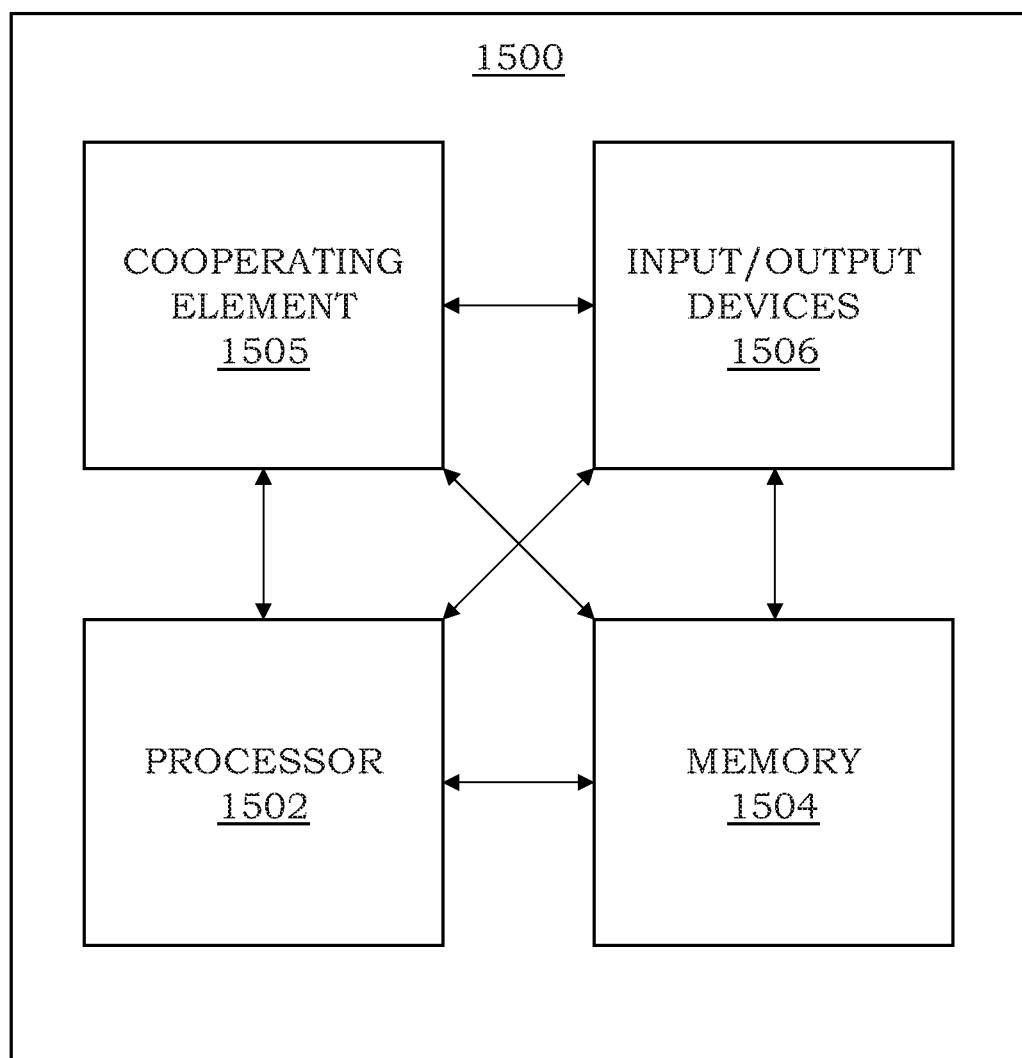
FIG. 15 depicts a high-level block diagram of a computer suitable for use in performing various functions presented herein.

FIG. 15 depicts a high-level block diagram of a computer suitable for use in performing various functions described herein.

The computer 1500 includes a processor 1502 (e.g., a central processing unit (CPU), a processor having a set of processor cores, a processor core of a processor, or the like) and a memory 1504 (e.g., a random access memory (RAM), a read only memory (ROM), or the like). The processor 1502 and the memory 1504 may be communicatively connected.

The computer 1500 also may include a cooperating element 1505. The cooperating element 1505 may be a hardware device. The cooperating element 1505 may be a process that can be loaded into the memory 1504 and executed by the processor 1502 to implement functions as discussed herein (in which case, for example, the cooperating element 1505 (including associated data structures) can be stored on a non-transitory computer-readable storage medium, such as a storage device or other storage element (e.g., a magnetic drive, an optical drive, or the like)).

The computer 1500 also may include one or more input/output devices 1506. The input/output devices 1506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1500 of FIG. 15 may represent a general architecture and functionality suitable for implementing functional elements described herein, portions of functional elements described herein, or the like, as well as various combinations thereof. For example, computer 1500 may provide a general architecture and functionality that is suitable for implementing one or more elements presented herein (e.g., a communication endpoint 110 or portion thereof, a router 121 or portion thereof, a packet fragmentation control element 130 or portion thereof, or the like).

It will be appreciated that various functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that various functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions that, when executed by the at least one processor, cause the apparatus to at least:
   support communication of an Internet Protocol (IP) packet including an IP version 6 (IPv6) header and an IPv6 Extension Header (EH), wherein the IPv6 EH includes a first flag configured to be set in a manner indicative as to whether the IP packet is permitted to be fragmented and a second flag configured to be set in a manner indicative as to whether the IPv6 EH includes a reporting address.

2. The apparatus of claim 1, wherein the IPv6 EH includes a reporting address field configured to include the reporting address.

3. The apparatus of claim 1, wherein the IPv6 header includes a Next Header field including a value configured to indicate that the IPv6 EH includes fragmentability information.

4. The apparatus of claim 1, wherein the IP packet includes a payload, wherein the IPv6 EH is located between the payload and the IPv6 header.

5. The apparatus of claim 1, wherein the IPv6 EH includes a third flag configured to, when the IPv6 EH includes the reporting address, indicate whether the reporting address is an IP version 4 (IPv4) address or an IPv6 address.

6. The apparatus of claim 5, wherein the IPv6 EH includes a fourth flag configured to indicate whether an error associated with fragmentation of the IP packet is to be reported to a source of the IP packet in addition to being reported to the reporting address.

7. The apparatus of claim 1, wherein the reporting address is an address to which an error associated with fragmentation of the IP packet is to be reported.

8. The apparatus of claim 1, wherein the IPv6 EH includes a Next Header field, a Reserved field, a Flags field including the first flag and the second flag, and a Reporting Address field configured to include the reporting address.

9. The apparatus of claim 1, wherein, to support communication of the IP packet, the instructions, when executed by the at least one processor, cause the apparatus to at least:
generate the IPv6 EH;
form the IP packet including the IPv6 EH; and
send the IP packet toward a network element.

10. The apparatus of claim 1, wherein, to support communication of the IP packet, the instructions, when executed by the at least one processor, cause the apparatus to at least:
receive the IP packet; and
determine handling of the IP packet based on the IPv6 EH.

11. The apparatus of claim 10, wherein, to determine handling of the IP packet based on the IPv6 EH, the instructions, when executed by the at least one processor, cause the apparatus to at least:
determine a packet size of the IP packet;
determine a maximum transmission unit (MTU) size of a next hop for the IP packet; and
determine, in response to a determination that the packet size of the IP packet is greater than the MTU size of the next hop for the IP packet and based on the first flag from the IPv6 EH, whether to fragment the IP packet.

12. The apparatus of claim 1, wherein the IP packet is an IP fragment of an original IP packet, wherein the IP packet further includes an IP fragment header.

13. The apparatus of claim 12, wherein the IPv6 EH is located between the IP fragment header and the IPv6 header.

14. A non-transitory computer-readable medium storing instructions that, when executed by an apparatus, cause the apparatus to at least:
support communication of an Internet Protocol (IP) packet including an IP version 6 (IPv6) header and an IPv6 Extension Header (EH), wherein the IPv6 EH includes a first flag configured to be set in a manner indicative as to whether the IP packet is permitted to be fragmented and a second flag configured to be set in a manner indicative as to whether the IPv6 EH includes a reporting address.

15. A method, comprising:
supporting communication of an Internet Protocol (IP) packet including an IP version 6 (IPv6) header and an IPv6 Extension Header (EH), wherein the IPv6 EH includes a first flag configured to be set in a manner indicative as to whether the IP packet is permitted to be fragmented and a second flag configured to be set in a manner indicative as to whether the IPv6 EH includes a reporting address.

* * * * *